(12) United States Patent
Mizutani et al.

(10) Patent No.: US 6,586,725 B2
(45) Date of Patent: Jul. 1, 2003

(54) OPTICAL GYRO, DRIVING METHOD AND SIGNAL PROCESSING METHOD THEREFOR

(75) Inventors: Natsuhiko Mizutani, Tokyo (JP); Takahiro Numai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/900,953

(22) Filed: Jul. 10, 2001

(65) Prior Publication Data

US 2002/0033949 A1 Mar. 21, 2002

(30) Foreign Application Priority Data

Jul. 12, 2000 (JP) .......................... 2000-211379
Jul. 12, 2000 (JP) .......................... 2000-211853

(51) Int. Cl.$^7$ .............................................. G01B 9/10
(52) U.S. Cl. ...................... 250/227.28; 356/459; 372/94
(58) Field of Search ........................... 250/216, 227.11, 250/227.19, 227.27, 227.28; 356/459, 461, 472, 474, 475; 372/94, 108, 64

(56) References Cited

U.S. PATENT DOCUMENTS

| | | | | |
|---|---|---|---|---|
| 4,035,081 A | * | 7/1977 | Sepp et al. | .................. 356/459 |
| 4,431,308 A | | 2/1984 | Mitsuhashi et al. | .......... 356/350 |
| 4,913,548 A | | 4/1990 | Vick | ........................... 356/350 |
| 5,764,681 A | | 6/1998 | Ballantyne et al. | ........... 372/94 |

FOREIGN PATENT DOCUMENTS

| | | |
|---|---|---|
| JP | 57-43486 | 3/1982 |
| JP | 4-174317 | 6/1992 |
| JP | 6-38529 | 5/1994 |

* cited by examiner

Primary Examiner—Que T. Le
(74) Attorney, Agent, or Firm—Fitzpatrick, Cella, Harper & Scinto

(57) ABSTRACT

An optical gyro is provided with a ring laser and detection unit for detecting the beat frequency of said ring laser, and comprises a first ring laser of which beat frequency decreases when the angular velocity increases in a certain direction from a standstill state and a second ring laser of which beat frequency increases when the angular velocity increases regardless of the rotating direction. The first and second ring lasers are so positioned as to be mutually independent optically.

30 Claims, 15 Drawing Sheets

OPTICAL GYRO, DRIVING METHOD AND SIGNAL PROCESSING METHOD THEREFOR

BACKGROUND OF THE INVENTION

1. Field of the Invention

The present invention relates to a ring laser, and more particularly to a gyro apparatus for detecting rotation utilizing a semiconductor laser, in particular a gyro apparatus capable of detecting the rotating direction, and a driving method and a signal processing method therefor.

2. Related Background Art

As the gyro apparatus for detecting the angular velocity of rotation, there are already known a mechanical gyro having a rotor or an oscillator, and an optical gyro. Particularly the optical gyro is causing a revolution in the field of gyro technology, since it can be activated instantly and has a wide dynamic range.

Within such-optical gyro, there are known a ring laser gyro, an optical fiber gyro, a passive ring resonator gyro etc. The ring laser gyro utilizing a gas laser is already commercially employed in the airplanes or the like.

Also as a compact ring laser gyro of high precision, there is proposed a gyro based on a semiconductor ring laser formed on a semiconductor substrate, as disclosed in the Japanese Patent Publication No. 62-39836, the Japanese Patent Application Laid-open No. 4-174317 and the Japanese Patent Publication No. 6-38529.

The gyro based on the semiconductor ring laser enables reduction in the device size, in the electric power consumption and in the start-up time in comparison with the mechanical gyro having an oscillator, and is therefore suitable for use as an antivibration control device for preventing the error in phototaking by hand vibration in a still camera and a video camera.

In such a gyro, the beat frequency contains the information of angular velocity. For detecting the beat frequency, there are a method of converting the beat frequency into a voltage signal by a frequency-voltage conversion circuit, and a method of directly detecting the beat frequency by a frequency counter.

SUMMARY OF THE INVENTION

However, the conventional ring laser gyro is incapable of detecting the rotating direction by its output signal. Therefore the rotating direction is detected by applying a small rotational vibration (dither) and utilizing the correlation between such dither and the signal.

Also the Japanese Patent Publication No. 62-39836 and the Japanese,Patent Application Laid-open No. 4-174317 do not suggest the specific method for detecting the rotating direction.

In consideration of the foregoing, an object of the present invention is to provide an optical gyro capable of detecting the angular velocity and the rotating direction with sufficient accuracy.

Another object of the present invention is to provide a driving method for the optical gyro, capable of suppressing the variation in the beat frequency at the standstill state.

(1) At first a case of employing two ring lasers will be explained.

The optical gyro of the present invention is provided with ring lasers and detection means for detecting the beat frequency of the ring lasers, wherein there are a first ring laser which increases the beat frequency when the angular velocity increases to a certain direction from the standstill state, and a second ring laser which increases the beat frequency when the angular velocity increases regardless of the rotating direction, and such first and second ring lasers are positioned so as to be optically independent of each other.

In a such configuration, the beat frequencies of the two ring lasers correspond to the frequencies of the variations in the impedances of the respective ring lasers, and such changes in the frequencies corresponding to the variations of the impedances have respectively different dependences on the angular velocity. It is therefore possible to obtain the angular velocity by signal processing of such changes. In the following, a more detailed description will be given on a configuration employing a semiconductor ring laser as the ring laser.

In the semiconductor ring laser, the relationship between the angular velocity and the signal frequency becomes non-linear or the signal cannot be obtain, in a certain angular velocity range, though such situation depends on the shape of the wave guide path to a certain extent.

By employing the two semiconductor ring lasers of mutually different angular velocity dependence, with different angular velocity ranges of such non-linearity, it is possible to obtain the signals from the two semiconductor ring lasers and to execute signal processing by employing either of the signals or combining the signals. Such process allows to obtain the angular velocity without being influenced by the non-linearity.

Also in the first semiconductor ring laser, the frequency change corresponding to the variation in the impedance is not symmetrical with respect to the rotating direction (sign of the angular velocity), and this fact can be utilized for detecting the rotating direction.

Also by executing addition or subtraction with suitable weighting on the frequency changes corresponding to the variations in the impedances in the two semiconductor ring lasers, the beat frequency in the first semiconductor ring laser in the standstill state can be obtained. Therefore, that it is possible to execute feedback control to suppress the variation in beat frequency in the stand still state. Also, it is possible to reflect the variation in the beat frequency in the standstill state on the single processing for obtaining the angular velocity.

Consequently, a gyro, in which precisely measures the angular velocity and the rotating direction, can be constructed from such two semiconductor ring lasers.

Also the signal processing method for the optical gyro of the present invention is featured in that the angular velocity is detected from the signal of the first ring laser when the absolute value of the angular velocity is smaller than a predetermined value, and the absolute value of the angular velocity is obtained from the signal of the second ring laser when the absolute value of the angular velocity is larger than the predetermined value.

Also the signal processing method for the optical gyro of the present invention is featured in that, in a prespecified first angular velocity range, the signal from the first ring laser and the signal from the second ring laser are processed to determine the beat frequency of the standstill state, and, in a second angular velocity range, the angular velocity is obtained from the aforementioned beat frequency of the standstill state,and the signal from the first semiconductor ring laser.

It is further featured in that the angular velocity ranges are determined from the result of processing of the signal from the first ring laser and the signal from the second ring laser, and the method of signal processing is switched according to such ranges.

Furthermore, the signal processing method for the optical gyro of the present invention is featured in that the signal from the first ring laser and the signal from the second ring laser are processed and the rotating direction is detected from the result of such processing.

Also the driving method for the optical gyro of the present invention is featured in that the signal from the first ring laser and the signal from the second ring laser are processed to determine a value corresponding to the beat frequency at the standstill state, and feedback control is executed so as to stabilize such a beat frequency.

Furthermore, the optical gyro of the present invention is featured in that a first ring laser having a tapered area asymmetrical to the optical wave guide and a second ring laser not having an asymmetrical tapered area are positioned so as to be optically independent.

(2) In the following a case of employing three ring lasers will be explained.

The optical gyro of the present invention is provided with mutually optically independent three or more semiconductor ring lasers, including at least a pair of the semiconductor ring lasers showing mutually opposite changes in the frequency of the variation in the impedance with respect to the rotation in a direction, and a ring laser in which the beat frequency at the standstill state is zero.

The optical gyro of the present invention is provided with three or more semiconductor ring lasers each of which shows a change in the frequency of the variation in the impedance between terminals according to the applied angular velocity and is provided with electrical terminals for detecting such variation in the impedance and which are provided on mutually non-perpendicular planes so as to be mutually optically independent, and which include a first semiconductor ring laser showing a decrease in the frequency of the variation in the impedance when the angular velocity increases in a direction, a second semiconductor ring laser showing an increase in the frequency of the variation in the impedance when the frequency of the variation in the impedance of the first semiconductor ring laser decreases, and a third semiconductor ring laser showing an increase in the frequency of the variation in the impedance when the absolute value of the angular velocity increases.

In the above-descibed configuration, since the semiconductor ring lasers are mutually independent optically, the frequency of the variation in the impedance of the first and second semiconductor ring lasers becomes higher in one of these semiconductor lasers and lower in the other, when the optical gyro is rotated in whichever direction. Also in the third semiconductor ring laser, the frequency of the variation in the impedance is proportional to the absolute value of the angular velocity of the rotation except for an area with smaller angular velocity in which the lock-in is large.

Therefore, in a range with a small angular velocity, the signals indicating the changes in the frequencies of the impedance variations in the first and second semiconductor ring lasers are processed. Between the semiconductor ring lasers, it is possible to separate a noise which shows changes of the same sign and a signal which dependents on the angular velocity and shows changes of different signs. Therefore, the signal-to-noise ratio is improved, and the angular velocity is precisely obtained, including the sign indicating the rotating direction. Also in the third semiconductor ring laser, in a range of large angular velocity, which is free from the lock-in, the angular velocity can be precisely obtained from the change in the frequency of the impedance variation in the third semiconductor ring laser. Such angular velocity can be obtained with a high precision since it is not influenced by the fluctuations in the frequency of the impedance variation in the standstill state. Also, even in such an angular velocity range, it is possible to process the changes in the frequencies of the impedance variations in the first and second semiconductor ring lasers thereby separating an angular velocity-dependent signal showing changes of different signs between these semiconductor lasers, and determining the rotating direction from the sign of such signal.

Also in the optical gyro of the present invention, each of the first and second semiconductor ring lasers has laser lights which propagate in the mutually opposite directions in the respective optical resonator and have different oscillation frequencies at the standstill state, wherein the relationship of magnitude of the oscillation frequencies of the laser light propagating clockwise and that propagating counterclockwise is inverted between the aforementioned two lasers, while, in the third semiconductor ring laser, the laser lights propagating in the mutually opposite directions in the optical resonator have the same oscillation so that frequency at the standstill state.

In the above-described configuration, in each of the first and second semiconductor ring lasers, the two laser lights propagating in the mutually opposite directions in the respective optical resonator and having different oscillation frequencies at the standstill state generate an optical beat within the optical resonator. Also, since the first and second semiconductor ring lasers are mutually independent optically, the oscillation frequencies of these laser lights change independently when the optical gyro equipped with such semiconductor lasers is rotated. As the relationship of magnitude of the oscillation frequencies of the clockwise propagating laser light and the counterclockwise propagating laser light is inverted between the two semiconductor ring lasers, the frequency of the optical beat in the optical resonator increases in one of the semiconductor lasers while that in the other decreases when the gyro is rotated.

In the third semiconductor ring laser, when the angular velocity of rotation is large and is free from lock-in, the oscillation frequencies of the clockwise propagating laser light and the counterclockwise propagating laser light change independently to generat an optical beat in the optical resonator. The frequency of such optical beat is proportional to the absolute value of the angular velocity. The change in the frequency of the optical beat in the first to third semiconductor ring lasers can be detected as a change in the frequency of the impedance variation between the terminals.

Therefore, in a range of small angular velocity, the changes in the frequencies of the impedance variations in the first and second semiconductor ring lasers are processed. Between the semiconductor ring lasers, it is possible to separate a noise which shows changes of same sign and a signal which is dependent on the angular velocity and shows changes of different signs. Therefore, the signal-to-noise ratio is improved and precise angular velocity is obtained, including the sign indicating the rotating direction. Also in the third semiconductor ring laser, in a range where the angular velocity is large and free from lock-in, the angular velocity can be obtained precisely from the change in the frequency of the impedance variation in the third semiconductor ring laser. Such angular velocity can be obtained with a high precision since it is not influenced by the change in the frequency of the impedance variation in the standstill state. Also, even in such angular velocity range, it is possible to process the changes in the frequencies of the impedance variations in the first and second semiconductor ring lasers to separate an angular velocity-dependent signal showing changes of different signs between these semiconductor lasers, and to determine the rotating direction from the sign of such signal.

The optical gyro of the present invention is featured in that each of the first and second semiconductor ring lasers is provided, in a part of the optical wave guide, with a tapered portion consisting of a first portion in which the width of the optical wave guide gradually increases in the propagating direction of the clockwise laser light and a second portion in which the width of the optical wave guide gradually decreases, that the first portion is longer than the second portion in the first semiconductor ring laser while the second portion is longer than the first portion in the second semiconductor ring laser, and that the third semiconductor ring laser is not provided with such tapered portion.

In the above-described configuration, the tapered portions in the first and second semiconductor ring lasers are introduced in order to provide a difference between the oscillation frequencies of the clockwise laser light and the counterclockwise laser light in the standstill state. In addition, the relationship of the lengths of the first and second portions of the above-mentioned tapered portion is inverted between the first and second semiconductor ring lasers. Therefore the dependence of the resonator loss on the propagating direction becomes mutually opposite between the first and second semiconductor ring lasers, so that the magnitude relationship between the oscillation frequencies of the clockwise laser light and the counterclockwise laser light becomes inverted between the first and second semiconductor ring lasers.

The aforementioned tapered portion functions in more details in the following manner. The laser light propagates in the optical resonator, repeating total reflection at the interface of the optical wave guide. In the aforementioned tapered portion, there is a loss because the angle of incidence upon the interface of the optical wave guide becomes deviated from the total reflecting condition. As the angle of incidence upon the interface of the tapered portion is different depending on the propagating direction, a difference in the loss is generated, so that the resonator loss depends on the propagating direction. The difference in the losss results in a difference in the oscillation threshold of the ring laser. Therefore, when two laser lights of opposite propagating directions simultaneously oscillate in the samiconductor ring laser with the tapered portion, a difference in the density of the photons is produced. Such difference in the photon density leads to a difference in the oscillation frequency of the ring laser by a non-linear effect.

Also in the above-described configuration, since the third semiconductor ring laser is not provided with the tapered portion, the resonator loss has no dependence on the propagating direction, so that the oscillation frequency of the clockwise laser light coincides with that of the counterclockwise laser light in the standstill state.

In the first and second semiconductor ring lasers, the two laser lights propagating in the mutually opposite direction in the respective optical resonator and having different oscillation frequencies at the standstill state generate an optical beat in the optical resonator. Also, since the first and second semiconductor ring lasers are mutually independent optically, the oscillation frequencies of the laser lights vary independently when the gyro equipped with such semiconductor lasers is rotated. Since the magnitude relationship of the oscillation frequencies of the clockwise laser light and the counterclockwise laser light is inverted between the two semiconductor ring lasers, the frequency of the optical beat increases in one of the optical resonators and decreases in the other when the gyro is rotated.

Also in the third semiconductor ring laser, when it has a large angular velocity of rotation and is free from the lock-in, the oscillation frequencies of the clockwise laser light and the counterclockwise laser light vary independently to generate an optical beat in the optical resonator. The frequency of such optical beat is proportional to the absolute value of the angular velocity. The change in the frequency of the optical beat in any of the first to third semiconductor ring lasers can be detected as a change in the frequency of the impedance variation between the terminals.

Therefore, within a range where the angular velocity is small, signal processing is executed on the changes in the frequency of the impedance variation in the first and second semiconductor ring lasers. Between these semiconductor ring lasers, it is possible to separate a noise showing changes of the same sign and dependent signal angular velocity showing changes of different signs, thereby improving the signal-to-noise ratio and precisely obtaining the angular velocity, including the sign indicating the rotating direction. Also in the third semiconductor ring laser, in a range where the angular velocity is large and is not influenced by lock-in, the angular velocity can be obtained from the change in the frequency of the impedance variation in the third semiconductor ring laser. Such angular velocity is of a high precision, since it it not influenced by the change in the frequency of the impedance variation in the standstill state. Also in such angular velocity range, the changes in the frequencies of the impedance variations in the first and second semiconductor ring laser can be processed to obtain an angular velocity-dependent signal showing the changes in opposite directions between these semiconductor lasers, and the rotating direction can be judged from the sign of such signal.

Also in the optical gyro of the present invention, the ratio of the area surrounded by the optical resonator to the circumferential length thereof is the same in the first and second semiconductor ring lasers.

In the above-described configuration, the ratio of the area surrounded by the optical resonator to the circumferential length thereof is a parameter determining the absolute value of the change in the beat frequency with respect to the change in the angular velocity. If this parameter is the same in the two semiconductor ring lasers, the amount of the aforementioned change in the beat frequency is the same in the absolute value and is different in the sign. It is therefore further facilitated to separate the angular velocity-dependent signal showing changes of different signs between the semiconductor ring lasers, from the noise or the change in the beat frequency in the standstill state, showing changes of same sign, whereby the signal-to-noise ratio can be improved. As a result, the angular velocity and the rotating direction can be known in more precise manner from the angular velocity-dependent signal.

Also in the optical gyro of the present invention, the shapes of the optical resonators of the first and second semiconductor ring lasers are mutually in a mirror symmetry relationship. In the above-described configuration, since the shapes of the optical resonators of the first and second semiconductor ring lasers are mutually in a mirror symmetry relationship, the dependence of the resonator loss on the propagating direction also becomes mirror symmetric between the two semiconductor ring lasers. More specifically, the propagating loss of the clockwise laser light in the first semiconductor ring laser becomes equal to that of the counterclockwise laser light in the second semiconductor ring laser, and same applies to other laser lights. Therefore, if the driving condition is the same in the two semiconductor ring lasers, the beat frequencies mutually coincide at the standstill state. In the relationship between the angular velocity and the frequency of impedance variation, such beat frequency at the standstill state is a component not dependent on the angular velocity. If this value is the same in the two semiconductor ring lasers, it becomes possible to highly precisely separate a signal component dependent on the angular velocity by a subtracting operation on the signals from the two semiconductor ring lasers. The signal-to-noise ratio can be improved since the noise component not dependent on the angular velocity can also be suppressed by the subtracting operation. As a result, the angular velocity and the rotating direction can be known in precise manner.

Also in the optical gyro of the present invention, the ratio of the area surrounded by the optical resonator to the circumferential length thereof is the same between at least either of the first and second semiconductor ring lasers and the third semiconductor ring laser.

In the above-described configuration, the ratio of the area surrounded by the optical resonator to the circumferential length thereof in at least either of the first and second semiconductor ring lasers and in the third semiconductor ring laser is a parameter determining the absolute value of the change in the beat frequency with respect to the change in the angular velocity. If this parameter is the same in the two semiconductor ring lasers, the amount of the aforementioned change in the beat frequency is the same at least in the absolute value. Therefore, if the angular velocity of the rotation of the gyro is larger than the angular velocity affected by the lock-in in the third semiconductor ring laser, the frequency of the optical beat proportional to the absolute value of the angular velocity in the third semiconductor ring laser and the amount of change of the beat frequency from the standstill state in at least either of the first and second semiconductor ring lasers become mutually equal in the absolute value. Hence, it is possible to precisely separate the beat frequency at the standstill state and to control the driving condition for the semiconductor ring laser in such a manner that such beat frequency is stabilized in time. Also in separating the angular velocity dependent signal, it is possible to reduce the fluctuations of the signal in time, thereby improving the precision of separation.

The driving method for the optical gyro of the present invention is featured in that each of the aforementioned plural semiconductor ring lasers is driven under a constant current, and a change in voltage is detected from the aforementioned electrical terminals.

Also the driving method for the optical gyro of the present invention is featured in that each of the aforementioned plural semiconductor ring lasers is driven under a constant voltage, and a change in the driving current. is detected from the aforementioned electrical terminals.

In the above-described configurations, the constant voltage,or current drive allows to obtain the variation in the impedance of the device by a simple circuitry, and also allows easy connection to various signal processing circuits. Also in the signal processing circuit, it is possible to separate an angular velocity dependent signal showing changes of different signs between the first and second semiconductor ring lasers from a noise or a variation in the beat frequency in the standstill state, showing changes of the same sign, thereby improving the signal-to-noise ratio. It is also rendered possible to switch the signal processing method according to the angular velocity, and to precisely obtain the angular velocity from the signal of the third semiconductor ring laser when the angular velocity is large. In this manner, the angular velocity and the rotating direction can be precisely known within a wide angular velocity range.

Also in the driving method for the optical gyro of the present invention, the injection current or the applied voltage is the same in the first and second semiconductor ring lasers.

In the above-described configuration, the same injected current or the same applied voltage reduces the difference in the oscillation frequencies, the light intensities, and the heat generations in the first and second semiconductor ring lasers and brings about the coincidence of the oscillation frequencies in the standstill state, and is particularly useful when the shapes of the resonators of the two semiconductor ring lasers are in mirror symmetry. Such driving mode realizes the beat frequency in the standstill state, which constitutes a component not dependent on the angular velocity and a component corresponding to the frequency of impedance variation, which is common to the first and second semiconductor ring lasers. It is therefore rendered possible to easily and precisely separate the signal component dependent on the angular velocity from the noise and the component of the beat frequency not dependent on the angular velocity, thereby improving the signal-to-noise ratio. As a result, the angular velocity and the rotating direction can be known precisely from the angular velocity dependent signal.

The signal processing method for the optical gyro of the present invention is also featured in selecting specified one or multiple ones from the plural semiconductor ring lasers and obtaining the angular velocity from the signals, which are extended from selected semiconductor ring laser(s).

In the above-described configuration, by selecting the first and second semiconductor ring lasers, the variations in the beat frequency corresponding to the angular velocity in a range of small angular velocity can be obtained, and such variations can be processed to obtain the rotating direction and the angular velocity with an improve signal-to-noise ratio. Also in a range with large angular velocity and without influence of the lock-in, the beat frequency proportional to the absolute value of the angular velocity can be obtained from the third semiconductor ring laser, whereby the angular velocity can be obtained with high precision. It is therefore rendered possible to obtain an angular velocity signal of high precision and little influence of noise by selecting the devices and executing signal processing according to the angular velocity. It is also possible to improve the response speed of the gyro by selecting a device showing a high frequency of impedance variation and utilizing the signal from such device for processing.

The signal processing method for the optical gyro of the present invention is also featured in obtaining the angular velocity only from the signals of the first and second semiconductor ring lasers when the absolute value of the angular velocity is smaller than a predetermined value.

In the above-described configuration, in the first and second semiconductor ring lasers, the frequencies of the impedance variations change according to the angular velocity because of the absence of lock-in even when the absolute value of the angular velocity is smaller than the predetermined value. It is therefore possible to obtain the rotating direction and the angular velocity by processing such changes.

More specifically, when the optical gyro is rotated in whichever direction, one of the frequencies of the impedance variations in the first and second semiconductor ring lasers decreases while the other increases. By signal processing on these frequencies, it is thus possible to separate an angular velocity dependent signal showing changes of different signs in these semiconductor lasers from the noise showing changes of the same sign, thereby improving the signal-to-noise ratio and precisely obtainig the angular velocity including the sign indicating the rotating direction.

The signal processing method for the optical gyro of the present invention is also featured by arithmetically processing the frequencies of the impedance variations in the first and second semiconductor ring lasers thereby obtaining the angular velocity and the rotating direction.

In the above-described configuration, the arithmetic processing in the frequencies of the impedance variations in the first and second semiconductor ring lasers is to separate an angular velocity-dependent signal and the beat frequency at the standstill state which is not dependent on the angular velocity.

In such operation, angular velocity-dependent signal showing changes of opposite signs between the two semiconductor ring lasers is separated from the noise and the variation in the beat frequency at the standstill state showing changes of the same sign, whereby the signal-to-noise ratio can be improved. As a result, the angular velocity and the rotating direction can be known with even better precision from the angular velocity dependent signal.

The signal processing method for the optical gyro of the present invention is further featured in that the aforementioned arithmetic processing is a subtraction or a weighted averaging with a negative weighting.

In the above-described configuration, the difference in the frequencies of the impedance variations, which is obtained by the subtraction, is proportional to the angular velocity, including the sign indicating the rotating direction. Such configuration is particularly useful when if the first and second semiconductor ring lasers are under the same driving condition, and show approximately the same beat frequencies at the standstill state and the variations in the beat frequencies with respect to a change in the angular velocity are same in the absolute values but different in the sign.

Also the weighted averaging with negative weighting allows to cancel out a signal component resulting from the beat frequency at the standstill state, which is not dependent on the angular velocity, thereby a signal proportional to the angular velocity including the sign indicating the rotating direction is obtained. Such processing is beneficial when the two semiconductor ring lasers have different beat frequencies at the standstill state. The weighted averaging can be achieved by obtaining the reciprocals of the frequencies of the impedance variations of the two semiconductor ring lasers at the standstill state, and multiplying one of the reciprocals by (−1) as the weights.

In this operation, the angular velocity-dependent signal showing changes of different signs between the semiconductor ring lasers can be separated from the noise and the variation in the beat frequency at the standstill state showing changes of the same sign, whereby the signal-to-noise ratio can be improved. As a result, the angular velocity and the rotating direction can be measured with further improved precision, from the angular velocity dependent signal.

The signal processing method for the optical gyro of the present invention is further featured in executing an arithmetic processing on the frequency of the impedance variation in the third semiconductor ring laser, thereby obtaining the absolute value of the angular velocity.

The signal processing method for the optical gyro of the present invention is further featured in comparing the frequency of the impedance variation in at least either of the first and second semiconductor ring lasers with a reference frequency, thereby obtaining the rotating direction.

The signal processing method for the optical gyro of the present invention is further featured in executing an arithmetic processing on the frequency of the impedance variation in the first and second semiconductor ring lasers, thereby obtaining the rotating direction.

The signal processing method for the optical gyro of the present invention is further featured in that the arithmetic processing is a subtraction or a weighted averaging with negative weighting.

In the above-described configurations, if the angular velocity is larger than a predetermined value and is free from the lock-in, the third semiconductor ring laser does not have the beat frequency at the standstill state and generates a frequency of the impedance variation proportional to the absolute value of the angular velocity without being influenced by the variation in the beat frequency, whereby the absolute value of the angular velocity can be known precisely. In a such state, the rotating direction can be measured by comparing the frequency of the impedance variation between the terminal with a reference frequency in at least either of the first and second semiconductor ring lasers. Otherwise, the rotating direction can be obtain by comparing the frequencies of the impedance variation between the terminals of the first and second semiconductor ring lasers. It is therefore possible to obtain the angular velocity and the rotating direction with high precision, without being influenced by the beat frequency at the standstill state.

A driving method for the optical gyro of the present invention is featured in switching the method for controlling the driving condition, according to the value of the angular velocity signal obtained from the optical gyro.

In the above-described configuration, the aforementioned control of the driving condition is to stabilize the beat frequencies generated in the first and second semiconductor ring lasers in the standstill state, thereby improving the precision of separation from the beat frequency in the standstill state not dependent on the angular velocity. In this manner the angular velocity can be precisely determined from the angular velocity-dependent signal.

More specifically, in a range with a large angular velocity, the third semiconductor ring laser shows linearity to the angular velocity and does not have the beat frequency at the standstill state, so that it is free from the variation of such beat frequency. Therefore, in the range of a large angular velocity, the frequency of the impedance variation obtained in the third semiconductor ring laser is utilized for separating the beat frequencies at the standstill state in the first and second semiconductor ring lasers, thereby achieving control to stabilize such beat frequencies. In the range where the angular velocity is small, the frequencies of the impedance variations obtained only from the first and second semiconductor ring lasers are adopted to separate the beat frequencies of the first and second semiconductor ring lasers in the standstill ate, whereby executed is such control as to stabilize such beat frequencies.

The driving method for the optical gyro of the present invention is further featured, when the absolute value of the angular velocity is smaller than a predetermined value, by executing an arithmetic processing on the frequencies of the impedance variation in the first and second semiconductor ring lasers, and controlling the driving condition utilizing the result of such processing.

In the above-described configuration, the above-mentioned arithmetic processing is to separate a component not dependent on the angular velocity, based on the impedance variations between the terminals of the first and second semiconductor ring lasers. The above-mentioned control of the driving condition is to stabilize in time the component not dependent on the angular velocity, and such stabilization allows to improve the precision of separation of the signal component dependent on the angular velocity. In this manner, the angular velocity can be measured precisely from the angular velocity dependent signal.

The driving method for the optical gyro of the present invention is further featured in that the aforementioned arithmetic calculation is an addition or a weighted averaging.

In the above-described configuration, the addition or the weighted averaging is to separate a component not dependent on the angular velocity from the frequency signals, which indicate the impedance variations and are obtained from the first and second semiconductor ring lasers. By controlling the driving condition so as to stabilize in time the component not dependent on the angular velocity, it is possible to improve the precision of separation of the component dependent on the, angular velocity, and the angular velocity can be obtained precisely from the angular velocity dependent signal.

Particularly if, in the first and second semiconductor ring lasers, the amounts of change in the frequencies of the impedance variations with respect to the change in the angular velocity are mutually the same in the absolute value but different in the sign, the component not dependent on the angular velocity can be obtained by addition. Also if, in the first and second semiconductor ring lasers, the amounts of change in the frequencies of the impedance variations with respect to the change in the angular velocity are not mutually equal, it is possible to differentiate the absolute values of the amounts of change with respect to the angular velocity and adopt the reciprocals of the results of differentiation as the weights in the weighted averaging.

The driving method for the optical gyro of the present invention is further featured in, when the absolute value of the angular velocity is larger than a predetermined amount, taking the angular velocity obtained from the third semiconductor ring laser as a reference and controlling the drive condtion in such a manner that the angular velocity obtained from the first and second semiconductor ring lasers coincides with the above-mentioned reference angular velocity.

In the above-described configuration, the third semiconductor ring laser shows linearity to the angular velocity in the range of large angular velocity and does not have the beat frequency at the standstill state, thereby being free from the influence of the variation of the beat frequency and thus providing a high precision. Therefore, the angular velocity obtained from the third semiconductor ring laser is taken as the reference for control. The angular velocity can also be obtained from the first and second semiconductor ring lasers because of the changes in the frequencies of impedance variations according to the angular velocity, but is influenced by a change in the beat frequency at the standstill state. The control of the driving condition so as to bring the latter angular velocity to the reference value corresponds to suppressing the variation in the beat frequency at the standstill state.

Such a control of the driving condition to stabilize the beat frequency at the standstill state improves the precision of separation of the signal component dependent on the angular velocity, and the angular velocity can be precisely obtained from such an angular velocity-dependent signal.

The driving method for the optical gyro of the present invention is further featured by interrupting the drive for one of parts of or all of plural semiconductor ring lasers when the angular velocity is within a first predetermined angular velocity range and re-starting the drive when the angular velocity comes out of a second predetermined angular velocity range.

In the above-described configuration, when the angular velocity is within the first angular velocity range, the drive of a semiconductor ring laser, which does note effect the aforementioned signal processing, is interrupted to reduce the electric power consumption. When the angular velocity comes out of the second angular velocity range, the drive of such semiconductor ring laser is re-started and the signal obtained therefrom is also used in the aforementioned signal processing for detecting the angular velocity.

The driving method for the optical gyro of the present invention is further featured by interrupting the drive for the third semiconductor ring laser when the absolute value of the angular velocity is smaller than a first predetermined value and re-starting the drive when the absolute value of the angular velocity is larger than a second predetermined value.

In the above-described configuration, since the third semiconductor ring laser is influenced by the lock-in in the low angular velocity range, it is not used for the signal processing and the drive therefor is interrupted to reduce the electric power consumption when the absolute value of the angular velocity is smaller the first predetermined value. When the angular velocity becomes larger than the second predetermined value, the drive for the third semiconductor ring laser is re-started and the signal obtained therefrom is also used in the aforementioned signal processing for detecting the angular velocity.

The driving method for the optical gyro of the present invention is further featured in that the first angular velocity range is different from the second angular velocity range.

The driving method for the optical gyro of the present invention is further featured in that the first angular velocity range is included in the second angular velocity range.

In the above-described configuration, the angular velocity at which the drive of the semiconductor ring laser is interrupted is different from the angular velocity at which the drive is re-started, thereby realizing a hysteresis on the angular velocity and avoiding frequent on/off operations of the drive, which is caused by a small change in the angular velocity.

DETAILED DESCRIPTION OF THE PREFERRED EMBODIMENTS (1) At first a case of employing two ring lasers will be explained.

Figure 1A:
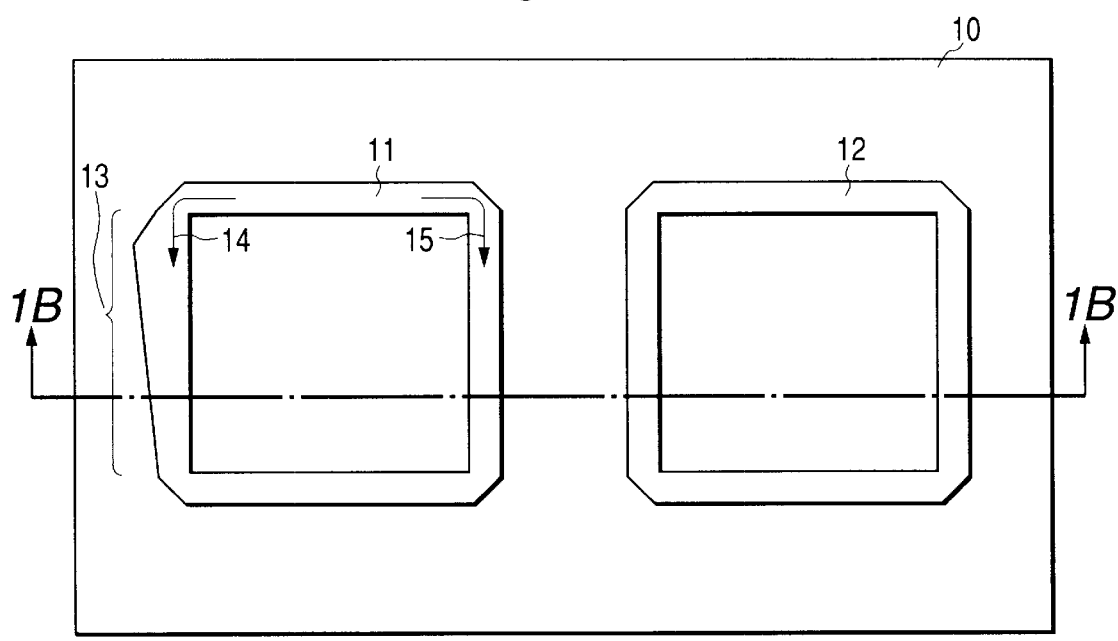
FIG. 1A is a schematic view showing an optical gyro constituting a first embodiment of the present invention.

A semiconductor ring laser provided with a wave guide path 11 shown in FIG. 1A is prepared as a first ring laser having a beat frequency variation range in which the beat frequency decreases when the angular velocity increases from the standstill state to a certain direction. The first ring laser is so designed that the above-mentioned beat frequency does not become zero at the standstill state. An asymmetrical tapered area 13 is introduced for this purpose. The difference in the oscillation frequencies of the counterpropagation laser beams is at least equal to 100 Hz, preferably at least equal to 1 kHz and more preferably at least equal to 10 kHz.

Also a semiconductor ring laser having a wave guide path 12 is prepared as a second ring laser in which the aforementioned beat frequency increases when the angular velocity increases regardless of the rotating direction.

These first and second ring lasers are so positioned as to be mutually independent optically. They may be positioned on any planes which are not mutually perpendicular, but they are preferably on mutually parallel planes or on the same plane.

As the ring laser, a semiconductor laser is explained as an example, but a gas laser may also be employed for this purpose. Also the shape of resonator is not limited to rectangular but may be triangular, polygonal or circular.

In the above-described configuration, in the standstill state of the aforementioned first semiconductor ring laser, two laser lights 14, 15 of different oscillation frequencies propagate in the mutually opposite directions in the optical resonator to generate an optical beat.

In the second semiconductor ring laser, in the standstill state, the laser lights propagating in the mutually opposite directions in the optical resonator have the same oscillation frequency and does not, therefore, generated the optical beat.

Since the two semiconductor ring lasers are mutually independent optically, when the gyro equipped with such semiconductor lasers is rotated, the oscillation frequencies of the laser lights change independently by the Sagnac effect.

In the first semiconductor ring laser, the difference in the oscillation frequencies of the clockwise propagating laser light and the counterclockwise propagating laser light increases when the gyro is rotated in a first rotating direction, but the difference decreases when the gyro is rotated in an opposite second rotating direction. Thus the frequency of the optical beat increases or decreases depending on the rotating direction.

In the second semiconductor ring laser, when the angular velocity of rotation is large and is not influenced by the lock-in, the oscillation frequencies of the clockwise propagating light and the counterclockwise propagating light independently change in proportion to the angular velocity by the Sagnac effect, thereby generating an optical beat in the resonator. The frequency of the optical beat is proportional to the absolute value of the angular velocity, and is zero at the standstill state.

The change in the frequency of the impedance variation in the two semiconductor ring lasers is detected as a change in the impedance variation between terminals.

In these two semiconductor ring lasers, the changes in the frequencies of the impedance variations have respectively different dependences on the angular velocity, and are therefore subjected to a signal processing to obtain the angular velocity and the rotating direction. The specific method of such signal processing will be explained later.

Also the changes in the frequencies of the impedance variation in these two semiconductor ring lasers may be subjected to an adding or subtracting operation with suitable weighting to obtain the beat frequency in the first semiconductor ring laser in the standstill state, and there can therefore be exercized feedback control for suppressing the variation in such beat frequency.

Otherwise, the variation in the beat frequency in the standstill state may be reflected on the calculation for obtaining the angular velocity. As a result, such two semiconductor ring lasers may be employed to construct a gyro capable of precisely detecting the angular velocity and the rotating direction.

(Tapered Area)

The aforementioned tapered area consists of a first portion in which the width of the optical wave guide gradually increases along the propagating direction of the clockwise propagating laser light and a second portion in which the width of the optical wave guide gradually decreases, wherein the first portion and the second portion have different lengths. Such configuration provides a difference in the oscillation frequencies between the counterpropagating laser beams at the standstill state. The tapered area is preferably so formed that the aforementioned difference in the oscillation frequencies between the counterpropagating laser beams is at least equal to 100 Hz, preferably at least equal to 1 kHz and more preferably at least equal to 10 kHz.

The aforementioned tapered area functions more specifically in the following manner.

The laser light propagates in the optical resonator with being total by reflected at the interface of the optical wave guide. In the aforementioned tapered area, a propagation loss is generated since the angle of incidence to the interface of the optical wave guide is deviated from the condition for the total reflection. The angle of incidence upon the interface in the tapered portion becomes different depending on the propagation direction of the light, which results in a difference in the propagation losses, so that the resonator loss is dependent on the propagating direction of the light.

Such difference in the resonator losses leads to a difference in the oscillation threshold of the ring laser, whereby a difference is generated in the photon densities when two counterpropagating laser lights are oscillated at the same time. Such difference in the photons result densities in a difference in the oscillation frequencies of the laser lights by a nonlinear effect.

On the other hand, the second semiconductor ring laser, without the tapered portion, is free from the dependence of the resonator loss on the light propagating direction. Consequently, in the standstill state, the oscillation frequency of the clockwise propagating laser light coincides with that of the counterclockwise propagating laser light.

In the above-described configuration, in the first semiconductor ring laser 11 in the standstill state, the two counterpropagating laser lights having different oscillation frequencies in the optical resonator generate a beat light in the optical resonator. On the other hand, in the second semiconductor ring laser 12 in the standstill state, the two counterpropagating laser lights in the optical resonator do not generate a beat light in the optical resonator because of the same oscillation frequency.

Since the two semiconductor ring lasers are mutually independent optically, when the gyro equipped with such semiconductor lasers is rotated, the oscillation frequencies of the laser lights change independently by the Sagnac effect.

In the first semiconductor ring laser 11, the difference in the oscillation frequencies of the clockwise propagating laser light and the counterclockwise propagating laser light increases when the gyro is rotated in a first rotating direction, but the difference decreases when the gyro is rotated in an opposite second rotating direction. Thus the frequency of the optical beat increases or decreases depending on the rotating direction.

In the second semiconductor ring laser 12, when the angular velocity of rotation is large and is not influenced by the lock-in, the oscillation frequencies of the clockwise propagating light and the counterclockwise propagating light independently change in proportion to the angular velocity by the Sagnac effect, thereby generating an optical beat in the resonator. The frequency of the optical beat is proportional to the absolute value of the angular velocity. The change in the frequency of the impedance variation in the two semiconductor ring lasers is detected as a change in the impedance variation between terminals provided in each ring laser.

In these two semiconductor ring lasers of the above-described configuration, the changes in the frequencies of the impedance variations have respectively different dependences on the angular velocity, and are therefore subjected to a signal processing to obtain the angular velocity and the rotating direction.

Also the changes in the frequencies of the impedance variation in these two semiconductor ring lasers may be subjected to an adding or subtracting operation with suitable weighting to obtain the beat frequency in the first semiconductor ring laser in the standstill state, and therefore be feedback control can be obtained for suppressing the variation in such beat frequency.

Otherwise, the variation in the beat frequency in the standstill state may be reflected on the calculation to obtain the angular velocity. As a result, such two semiconductor ring lasers may be employed to construct a gyro capable of precisely detecting the angular velocity and the rotating direction.

(Driving Method)

The optical gyro may be driven by driving each of the aforementioned semiconductor ring lasers under a constant current and detecting the change in the voltage from the aforementioned electrical terminals, or by driving each of the aforementioned semiconductor ring lasers under a constant voltage and detecting the change in the driving current from the aforementioned electrical terminals.

Such constant-voltage or constant-current drive allows to obtain the impedance of the device with a simple circuit structure, thereby enabling easy connection with various signal processing circuits.

Also the use of the signal processing circuit allows to detect the angular velocity without being influenced by the nonlinear relationship between the angular velocity and the signal frequency in each semiconductor ring laser.

Also, the change in the frequency of impedance variation in the first semiconductor ring laser is not symmetrical with respect to the rotating direction (sign of the angular velocity) and such fact can be utilized for detecting the rotating direction. Also through addition or subtraction with suitable weighting, there can be obtained the beat frequency of the first semiconductor ring laser in the standstill state, and feedback control can be executed for suppressing the fluctuation in such beat frequency. Otherwise, the fluctuation of the beat frequency in the standstill state can be reflected on the calculation to obtain the angular velocity. As a result, the angular velocity and the rotating direction can be measured in precise manner.

(Signal Processing Method)

Figure 3A:
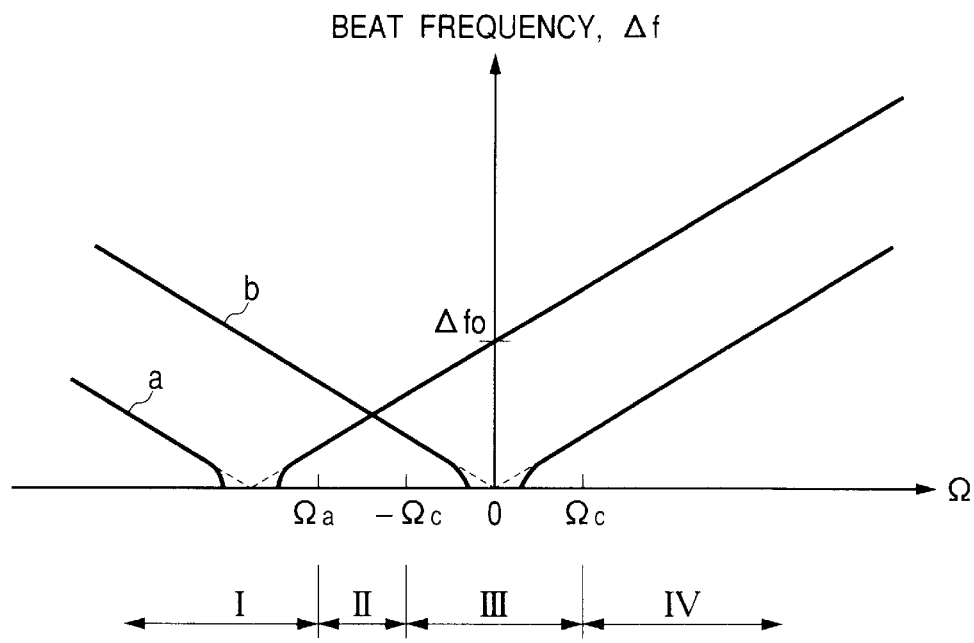
FIGS. 3A and 3B are charts showing the relationship of the frequency of a beat signal and the angular velocity in the optical gyro of the first embodiment.

FIG. 3A shows an example of the dependence of the beat frequency on the angular velocity in the first and second semiconductor ring lasers, wherein lines a and b, correspond to the first and second ring lasers 11, 12 respectively. Even when there exists an angular velocity range where the beat frequency is nonlinear function of the angular velocity, it is possible to avoid the influence of such non-linearity by switching the signal processing method according to the value of the angular velocity so as to exclude such angular velocity ranges where the nonlinear relationship between the angular velocity and the signal frequency exists such two semiconductor ring lasers. As a result, the angular velocity can be obtained in precise manner.

For example, when the absolute value of the angular velocity is smaller than a predetermined value (for example a value where the second semiconductor ring laser is in the lock-in), the angular velocity is detected by the signal a from the first semiconductor ring laser 11. Also when the absolute value of the angular velocity is larger than the aforementioned predetermined value, the angular velocity is detected by the signal b from the second semiconductor ring laser 12.

Also by subtracting the beat frequency $\Delta f_0$ in the standstill state from the frequency of the signal obtained from the first semiconductor ring laser 11, a signal proportional to the angular velocity, including the sign can be obtained. The angular velocity thus obtained has sufficient precision since it is not influenced by the nonlinearity in the second semiconductor ring laser 12.

Also when the absolute value of the angular velocity is larger than the predetermined value, the absolute value of the angular velocity can be obtained by the signal from the second semiconductor ring laser 12. The angular velocity can be obtained in precise manner since the frequency of the signal from the second semiconductor ring laser is proportional to the absolute value of the angular velocity and is still not influenced by the fluctuation of the beat frequency in the standstill state.

It is also preferable, in a first predetermined angular velocity range (range II in FIG. 3A), to process the signal a from the first semiconductor ring laser 11 and the signal b from the second semiconductor ring laser 12 to obtain the beat frequency in the standstill state and, in a second predetermined angular velocity range (range III in FIG. 3A), to determine the angular velocity from the aforementioned beat frequency $\Delta f_0$ at the standstill state and the signal from the first semiconductor ring laser.

More specifically, at any angular velocity in the first angular velocity range (range II in FIG. 3A), the addition of the signals from the first and second semiconductor ring lasers provides an amount corresponding to the beat frequency in the standstill state. In the second angular velocity range (range IV in FIG. 3B), the angular velocity is determined without utilizing the signal of the second semiconductor ring laser.

In more details, the beat frequency at the standstill state is subtracted from the beat frequency of the first semiconductor ring laser to obtain an amount proportional to the angular velocity. The obtained angular velocity contains an error if the beat frequency in the standstill state changes for example by a fluctuation in the temperature, but, in the above-described configuration, the beat frequency in the standstill state, measured last in the first angular velocity range can be used as an estimate value of the current beat frequency in the standstill state. Consequenlty the angular velocity can be obtained in precise manner in comparison with a case where a predetermined constant is used as the beat frequency of the standstill state in the signal processing. It is also possible to determine the angular velocity ranges from the result of processing of the signal from the first semiconductor ring laser and the signal b from the second semiconductor ring laser, and to switch the signal processing method according to such ranges. In such case, since the dependence of the beat frequency on the angular velocity is different between the first and second semiconductor ring lasers, the angular velocity ranges can be distinguished according to the result of process of the beat frequencies of these ring lasers. It is thus possible to detect the angular velocity in precise manner by executing the signal processing according to the angular velocity ranges.

It is also possible to process the signals from the first and second semiconductor ring lasers and to detect the rotating direction from the result of such signal processing. More specifically, the dependences of the beat frequency on the angular velocity in these two semiconductor ring lasers are combined to represent the rotating direction by the sign and the magnitude of the result of such combined calculation.

The aforementioned calculation is preferably a subtraction weighted by the ratio of the circumferential length of each ring resonator to the area surrounded by the resonator. The circumferential length of the ring resonator to the area surrounded by the resonator is a parameter determining the proportion coefficient between the angular velocity and the beat frequency, and the use of such parameter for weighting enables calculation in each semiconductor ring laser in correlation with the beat frequency, even if the circumferential length of the ring resonator or the area surrounded by the resonator is different between the ring lasers. Such signal processing enables precise detection of the angular velocity.

It is also preferable to compare the frequency of the impedance variation with a reference frequency and to obtain the rotating direction from the result of such comparison. In the first semiconductor ring laser, in a rotating state in a certain direction, the frequency of the impedance variation decreases in comparison with that in the standstill state, and increases in a rotating state in the opposite direction, in comparison with that in the standstill state. Consequently the rotating direction can be detected by comparing with the reference frequency in the standstill state taken as the reference frequency. It is also preferable to switch the control method for the driving condition, according to the value of the angular velocity signal obtained from the optical gyro. The beat frequency of the first semiconductor ring laser in the standstill state can be obtained by executing addition or subtraction, according to the angular velocity, on the signals of the first and second semiconductor ring lasers after appropriate weighting. Also if the angular velocity in such state is within an angular velocity range with little influence of nonlinearity in both the first and second ring lasers, feedback control is obtained on the beat frequency in the standstill state. An amount proportional to the angular velocity can be obtained by subtracting the beat frequency in the standstill state from the beat frequency of the first semiconductor ring laser. The angular velocity can be obtained precisely by the above-described control for suppressing the fluctuation in the beat frequency of the standstill state.

First Embodiment

In the following a first embodiment of the optical gyro of the present invention will be explained with reference to FIGS. 1A and 1B.

Referring to FIG. 1A, an optical gyro 10 of the present invention is provided with semiconductor ring lasers 11, 12 and a portion (tapered area) 13, in which the width of the wave guide path changes, provided in a part of the optical wave guide. The semiconductor ring laser 11 contains a counterclockwise propagating mode indicated by an arrow 14 and a clockwise propagating mode indicated by an arrow 15. Same applies also to the semiconductor ring laser 12.

The two semiconductor ring laser elements 11, 12 were prepared in the following manner.

Figure 1B:
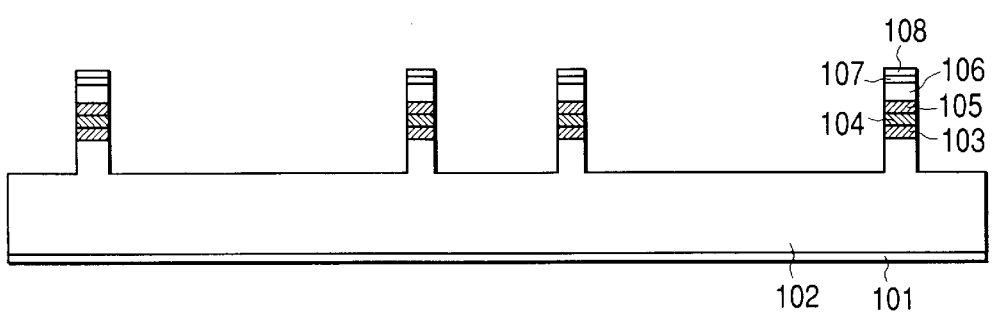
FIG. 1B is a cross-sectional view along a line 1B—1B in FIG. 1A.

FIG. 1B is a cross-sectional view of the device along a line 1B—1B in FIG. 1A, and a multi-layered semiconductor structure shown therein was at first prepared by metalloorganic vapor phase epitaxy. More specifically, on an n-InP substrate 102, an undoped InGaAsP guiding layer 103 of a bondgap wavelength of 1.3 μm (0.15 μm thick), an undoped InGaAsP active layer 104 of a bondgap wavelength of 1.55 μm (0.1 μm thick), an undoped InGaAsP guiding layer 105 of a bondgap wavelength of 1.3 μm (0.15 μm thick), a p-InP cladding layer 106 (1.5 μm thick) and a p-InGaAs cap layer 107 were grown. Then photoresist was coated on the p-InGaAs cap layer, then exposed to a mask pattern Y, and finally developed to obtain a resist pattern in the shape of the ring resonator. Then reactive ion etching with chlorine gas was conducted to form a semiconductor ring laser consisting of a ridge wave guide with a height of 3 μm. Cr/Au were evaporated on the ridge wave guide to constitute an anode 108. On the lower face of the wafer, AuGe/Ni/Au were evaporated to form a cathode 101. The metals were formed into an alloy in hydrogen atmosphere to obtain ohmic contact between the electrodes and the semiconductor.

In the following the shape of the wave guide will be explained in detail.

The semiconductor ring laser 11 has an asymmetrical shape. More specifically, the tapered portion 13 consists of a first portion in which the width of the optical wave guide increases along the propagating direction of the counter-clockwise propagating laser light and a second portion in which the width of the optical wave guide decreases, and the first portion and the second portion have different lengths. Particularly in the illustrated example, the first portion is extremely short. The resonators of the semiconductor ring lasers 11 and 12 have the same area surrounded by the optical path and the same circumferential length. Therefore, the ratio of the area surrounded by the resonator to the circumferential length of the resonator is the same in both resonators. However, it is naturally unnecessary to have the same ratio in both resonators.

The semiconductor ring lasers 11, 12 formed on the same substrate are placed apart from each other to prevent respective laser lights from mutually coupling. The distance was selected at about 15 μm or larger in order to avoid the influence of evanescent light. Also in the asymmetrical tapered portion 13, laser light is emitted from the wave guide due to mode conversion. Therefore, the tapered portion 13 is positioned so as not to be face-to-face to the semiconductor ring laser 12.

Otherwise, between the semiconductor ring lasers, the semiconductor layer may be left unetched to form an absorbent member. Also on the lateral and upper faces of such absorbent member, an insulating film and an electrode metal may be provided to form a light shielding member. Such light shielding member may be positioned in such inclined manner that the light reflected on the surface thereof does not return to the semiconductor ring laser.

A light shielding member may be formed by an insulating film formed on a lateral face of the device and an electrode metal formed thereon.

Such device arrangement, absorbent member and/or light shielding member allows to reduce the interaction between the semiconductor ring lasers.

It is also made possible that the reflected light causes coupling of the clockwise and counterclockwise propagating laser lights, whereby the lock-in phenomenon can be, prevented.

Figure 2:
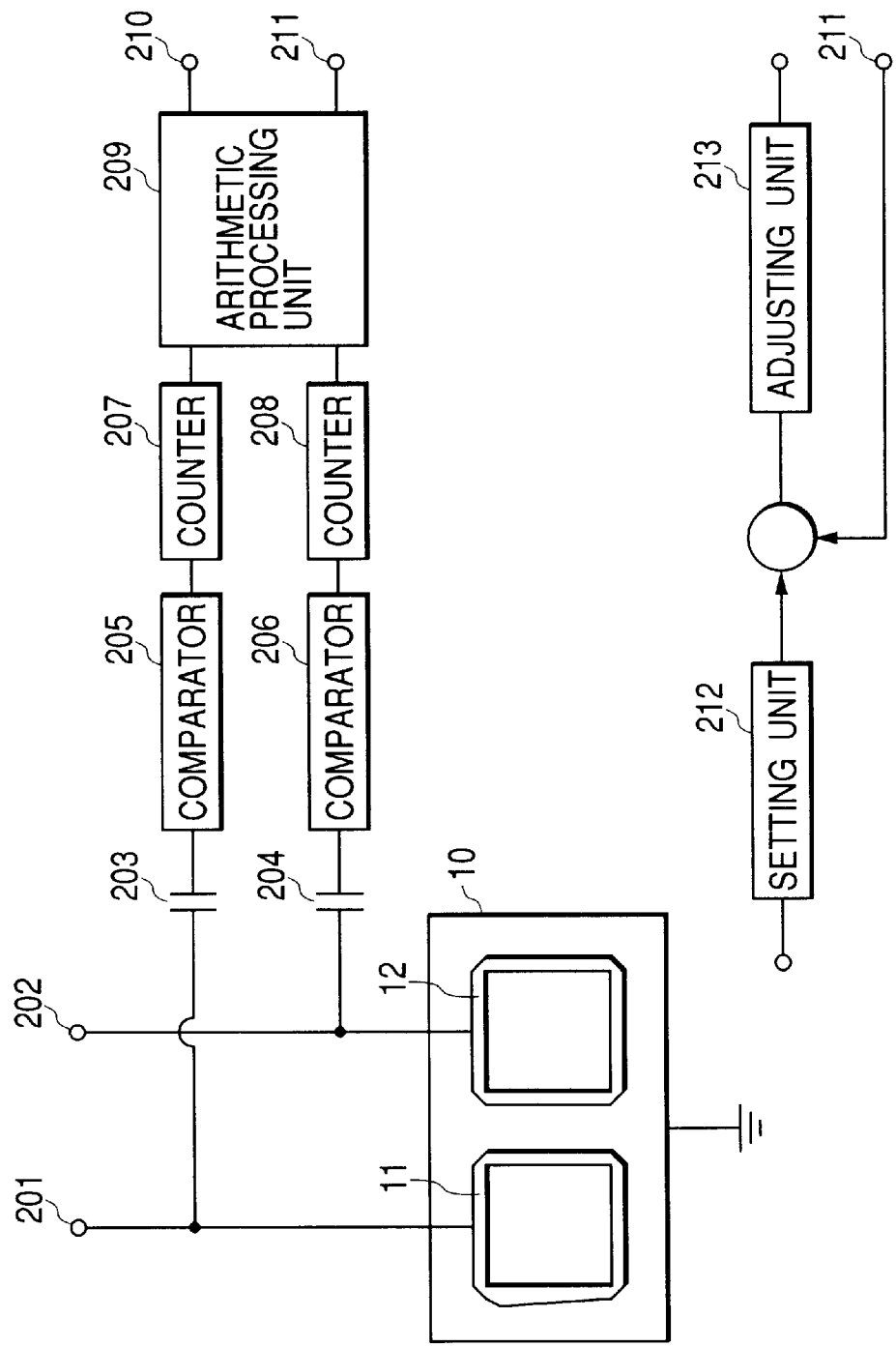
FIG. 2 is a view showing driving and signal processing circuits of the optical gyro of the first embodiment.

A circuit shown in FIG. 2 is employed in order to independently inject currents into the semiconductor ring lasers 11, 12 and to detect the respective terminal voltages.

In FIG. 2, there are shown an optical gyro 10 of the present invention, semiconductor ring lasers 11, 12, driving current input terminals 201, 202, coupling capacitors 203, 204, comparators 205, 206, counters 207, 208, an arithmetic processing circuit 209, an output terminal 210 and an error signal output terminal 211.

The terminal 201 is connected to a power source to drive the semiconductor ring laser 11 under a constant current at least equal to an oscillation threshold current. Above the oscillation threshold, a clockwise propagating laser light and a counterclockwise propagating laser light independently exist in the semiconductor ring laser 11.

The clockwise propagating laser light and the counterclockwise propagating laser light have different oscillation frequencies at the standstill state, owing to the function of the asymmetrical tapered portion 13 of the semiconductor ring laser 11 as will be explained in the following.

The laser light propagates in the optical wave guide with being totally reflected at the interface thereof, but a wave guide loss is generated in the tapered portion 13 because the angle of incidence upon the interface of the optical wave guide changes therein. The loss becomes different according to the propagating direction because of the difference in the angle of incidence in the tapered portion, so that the resonator loss depends on the propagating direction.

Since the resonator loss is different depending on the propagating direction of the laser light, the oscillation threshold of the semiconductor ring laser also becomes different depending on the propagating direction, so that, in a state where two laser lights exist together, the photon density becomes different in the two laser lights by the nonlinear optical effect. Following relations exist between the oscillation frequencies $f_j$ and the photon density $S_j$ of the coexisting two laser lights (modes), so that a difference in the photon densities results in a difference in the oscillation frequencies:

$$2\pi f_1 + \Phi_1 = \Omega + \sigma_1 - \rho_1 S_1 - \tau_{12} S_2$$
$$2\pi f_2 + \Phi_2 = \Omega + \sigma_2 - \rho_2 S_2 - \tau_{21} S_1 \qquad (1)$$

wherein $\Phi_i$ is phase, $\Phi$ is a resonant angular frequency, $\sigma_i$ is a mode pulling $\rho_i$ is a self mode pushing coefficient, and $\tau_{ij}$ is a cross mode pushing coefficient, and i, j=1, 2; i≠j. As the oscillation frequencies $f_{10}$ and $f_{20}$ of the laser lights are different in the standstill state, a beat of a frequency $\Delta f_0 = f_{20} - f_{10}$ is generated in the standstill state.

When the semiconductor ring laser rotates clockwise with an angular velocity $\Omega$, the oscillation frequency of the clockwise propagating first laser light decreases by the Sagnac effect, in comparison with the oscillation frequency $f_{10}$ in the non-rotating state, by:

$$\Delta f_1 = 2S\Omega/(\lambda_1 L) \qquad (2)$$

wherein S is an area surrounded by the ring resonator, L is a length of optical path, and $\lambda_1$ is a wavelength of the clockwise propagating first laser light in the medium. At the same time, the oscillation frequency of the counterclockwise propagating second laser light decreases, in comparison with the oscillation frequency $f_{20}$ in the non-rotating state, by:

$$\Delta f_2 = 2S\Omega/(\lambda_2 L) \qquad (3)$$

wherein $\mu_2$ is a wavelength of the laser light in the medium.

As the clockwise propagating first laser light and the counterclockwise propagating second laser light are simultaneously present in the ring resonator, a beat light of a frequency corresponding to the difference of the oscillation frequencies of the first and second laser lights is generated. The beat frequency $\Delta f$ is represented as:

$$\Delta f = f_2 - f_1 \qquad (4)$$
$$= f_{20} - f_{10} + (\Delta f_2 + \Delta f_1)$$
$$= f_{20} - f_{10} + (2S\Omega/L) \times (1/\lambda_2 + 1/\lambda_1)$$

The beat light induces a pulsation of the inversion with the same frequency $\Delta f$, thereby varying the impedance between the terminals. Therefore, when of the constant-current drive, a variation of voltage of the aforementioned frequency $\Delta f$ in the voltage between the terminals is observed. However, since the obserbed frequency is always positive, $|\Delta f|$ can be obtained.

If the oscillation frequencies $f_{10}$ and $f_{20}$ of the laser lights are different from each other in the standstill state as indicated by the line a in FIG. 3A, a beat $\Delta f_0=f_{20}-f_{10}$ is generated in the standstill state. When the gyro is rotated, the beat frequency increases or decreases according to the rotating direction. However, if the difference of the oscillation frequencies of the two laser lights is less than a threshold value (indicated by broken lines), a strong coupling is generated between the two laser lights whereby the laser lights cannot oscillate independent by. Such state is called a lock-in phenomenon in which the periodical variation cannot be observed in the beat light and in the voltage.

Also the terminal 202 is connected to a power source to drive the semiconductor ring laser 12 under a constant current above the oscillation threshold current. With the injected current above the oscillation threshold, the semiconductor ring laser 12 also generates laser oscillation, but, in the standstill state of the gyro, the two modes have the same photon density and therefore the same oscillation frequency.

When the gyro is rotated, the oscillation frequency of the clockwise propagating first laser light and that of the counterclockwise propagating second laser light vary by the Sagnac effect as in the case of the semiconductor ring laser 11. Even when the two laser lights are a strongly coupled by the backward scattering the standstill state, if the difference of the oscillation frequencies of the two laser lights exceeds a certain threshold value, a weak coupling of the modes is obtained, which enables laser oscillation with two indepedent modes, whereby the periodical variation in the beat light and in the voltage can be observed. If the backward scattering is sufficiently small to realize the weak coupling state of the two laser lights in the standstill state, beat light is generated by the rotation.

A line b in FIG. 3A shows the relationship between the angular velocity and the beat frequency when the two laser lights are strongly coupled in the standstill state. The beat frequency $\Delta f$ proportional to the absolute value of the angular velocity can be obtained, except for a range $-\Omega c<0<\Omega c$.

It should be noted that the lines a and b in FIG. 3A have the same inclination of the beat frequency $\Delta f$ as a function of the angular velocity $\Omega$, because the two ring resonators have the same ratio S/L value for the surrounded area S and the optical path length L. This fact simplifies the signal processing of the gyro as will be explained later, but such configuration is not restrictive.

The signal processing circuit shown in FIG. 2 detects the angular velocity in the following manner.

The signals indicating the variation in voltage, from the respective semiconductor ring lasers, transmit the capacitors 203, 204, and such frequency signals are shaped into rectangular signals by the comparators 205, 206. The numbers of pulses within a predetermined time are counted by the counters 207, 208. The pulse numbers from the respective devices are injected in the arithmetic processing circuit 209 and are processed to obtain an angular velocity signal and an error signal for adjusting the drive current.

At first the angular velocity is divided into a range I: $\Omega<\Omega a$, a range II: $\Omega a \leq \Omega<-\Omega c$, a range III: $-\Omega c \leq \Omega \leq -\Omega c$, and a range IV: $\Omega c<\Omega$. I incidates an angular velocity range in which the influence of nonlinearity by the lock-in phenomenon becomes large in the semiconductor ring laser 11 ($\Omega a$ being an angular velocity where such influence becomes not negligible), and III indicates an angular velocity range in which the influence of nonlinearity by the lock-in phenomenon becomes large in the semiconductor ring laser 12.

Figure 3B:
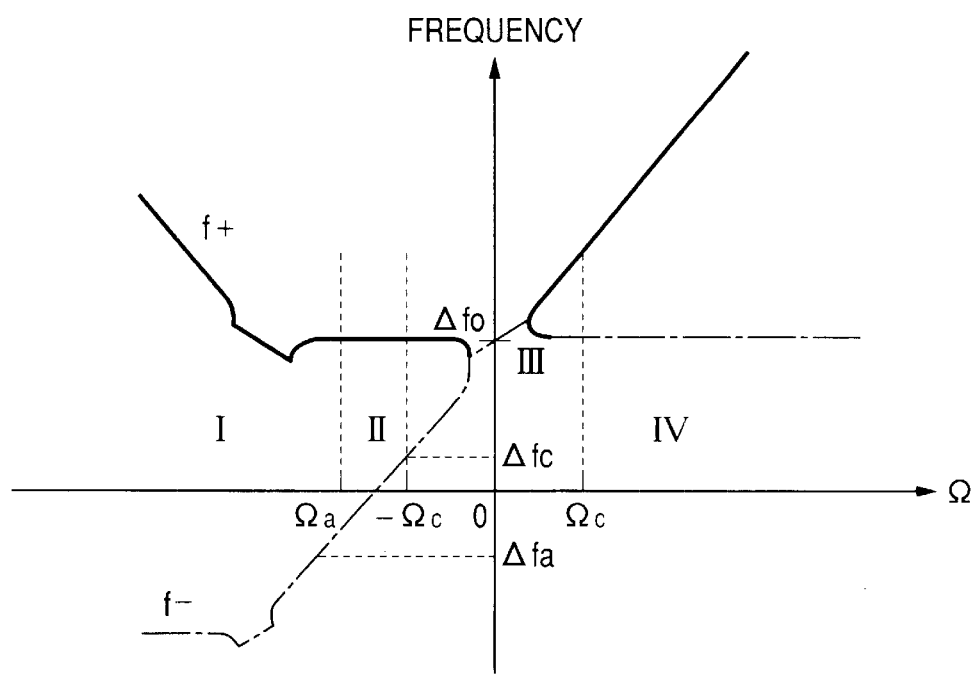

Then the beat frequency $\Delta fa$ of the semiconductor ring laser 11 and the beat frequency $\Delta fb$ of the semiconductor ring laser 12 are used to calculate the sum of the beat frequencies $f_+=\Delta fa+\Delta fb$, and the difference of the beat frequencies $f_-=\Delta fa+\Delta fb$. FIG. 3B shows the relationship among $\Omega$, $f_+$ (solid line) and $f_-$ (broken line).

In the angular velocity range I, the beat signal $\Delta fb$ from the semiconductor ring laser 12 is used to obtain the absolute value of the angular velocity. Then $-1$ is multiplied to represent the rotating direction, thereby obtaining a signal output 210. The signal from the semiconductor ring laser 11 is not reflected on the output. Because a sufficiently precise signal, which is proprtional to the angular velocity, cannot be obtained in this angular velocity range cannot be obtained due to the lock-in. This configuration is also useful to prevent a decrease in the response speed for the low beat frequency, which requires a longer signal processing time.

In the angular velocity range II, the beat signal $\Delta fb$ from the semiconductor ring laser 12 is used to obtain the absolute value of the angular velocity. Then $-1$ is multiplied to represent the rotating direction, thereby obtaining a signal output 210. Also, as the sum $f_+$ of the frequency of the beat signal from the semiconductor ring laser 11 and that from the semiconductor ring laser 12 corresponds to the beat frequency $\Delta f_0$ of the semiconductor ring laser 11 in the standstill state, the drive conditions of the semiconductor ring lasers 11, 12 are controlled in such a manner that such sum becomes constant. For this reason $f_+$ is outputted as the error signal 211.

In the angular velocity range III, $\Delta f_0$ is subtracted from the frequency $\Delta f_a$ of the beat signal of the semiconductor ring laser 11 to obtain a signal proportional to the angular velocity, including the sign representing the rotating direction, wherein $\Delta f_0$ is the reference beat frequency at the standstill state. The signal from the semiconductor ring laser 12 is not reflected on the output, because a linear variation with respect to the angular velocity cannot be obtained or the beat cannot be observed due to the lock-in. This configuration is also beneficial to prevent a decrease in the response speed for the low beat frequency, which requires a longer signal processing time.

Finally, in the angular velocity range IV, $\Delta f_b$ from the semiconductor ring laser 12 is used to obtain the absolute value of the angular velocity. Since the sign thereof representing the rotating direction is positive, it is directly outputted as the signal 210. Also, as the difference $f_-$ of the frequency of the beat signal from the semiconductor ring laser 11 and that from the semiconductor ring laser 12 corresponds to the beat frequency $\Delta f_0$ of the semiconductor ring laser 11 in the standstill state, the driveing conditions of the semiconductor ring lasers 11, 12 are controlled in such a manner that such sum becomes constant. For this reason $f_-$ is outputted as the error signal 211.

The beat frequency $\Delta f_0$ of the ring resonator semiconductor laser 11 in the standstill state is controlled in the following manner. An increase in the driving current for the ring laser above the threshold tends to increase the difference of the light intensities between the two modes shown in the equations (1), thereby increasing $\Delta f_0$. Therefore the control can be executed so as to increase or decrease the driving current respectively if $\Delta f_0$ decreases or increases.

In the setting unit 212, the error signal 211 from the aforementioned arithmetic processing circuit is used as the error signal corresponding to the preset amount (initial value of the beat frequency $\Delta f_0$ in the standstill state). Based on such value, the adjusting unit 213 adjusts the driving current for the semiconductor ring laser.

Since the semiconductor ring lasers 11, 12 are closely positioned on the same substrate and have the same ambient temperature, the driving conditions thereof can be regarded same if the injection currents to the two lasers are maintained same. In the present embodiment, the drive condition for the semiconductor ring laser 12 is always maintained same as that for the semiconductor laser 11.

The aforementioned control in the angular velocity ranges II and IV to match $f_+$ or $f_-$ with the standstill beat frequency $\Delta f_0$ of the semiconductor ring laser 11 can be regarded as a control aiming at matching the angular velocities obtained from the frequencies of the beat signals in the semiconductor ring lasers 11, 12. Here, $f_+$ or $f_-$ are obtained by processing the frequencies of the beat signals from the semiconductor ring lasers 11 and 12.

The aforementioned angular velocity ranges can be discriminated in the following manner. The angular velocity range I is identified if $f_-$ is negative and is smaller than a predetermined value $\Delta f_a$.

The angular velocity range II is identified if $f_-$ is smaller than a predetermined value $\Delta f_c$ and larger than $\Delta f_a$.

The angular velocity range III is identified if $f_-$ is positive and if the beat frequency in the semiconductor ring laser 12 is smaller than a predetermined value (or cannot be observed).

The angular velocity range IV is identified in other cases (if $f_-$ is larger than $\Delta f_c$, and if the beat frequency of the semiconductor ring laser 12 is larger than a predetermined value).

As explained in the foregoing, if the angular velocity is small, the signal proportional to the angular velocity including the sign representing the rotating direction is obtained from the beat frequency of the semiconductor ring laser provided with the tapered portion. Also if the angular velocity is large, the signal proportional to the absolute value of the angular velocity is obtained from the beat frequency of the semiconductor ring laser without the tapered portion. In this situation, the rotating direction can be obtained by processing the signals from the two semiconductor ring lasers (the aforementioned discriminating method for the angular velocity ranges indicates the rotating direction). Also there can be obtained optical gyro of excellent stability by the feedback control on the driving conditions of the semiconductor ring lasers.

A case of controlling the drive current by a feedback control system has been explained, but it is also possible to stabilize the beat frequency at the standstill state by feedback control on a temperature regulating circuit for the device. In such a case, a decrease in the device temperature the threshold current of the device, which accompanies a reduction in increases the intensity differece between the two modes under the same driving current. As a result, the beat frequency in the standstill state increases. Therefore, the control can be executed in so as to increase or decrease the device temperature respectively if the beat frequency in the standstill state increases or decreases.

The operation for obtaining the angular velocity can also be achieved, instead of the above-described method, by considering only two angular velocity ranges, namely an angular velocity range I': $|\Omega|<\Omega c$ and an angular velocity range II': $\Omega c<|\Omega|$.

In the angular velocity range I', $\Delta f_0$ is subtracted from the frequency $\Delta f_a$ of the beat signal of the semiconductor ring laser 11 to obtain a signal proportional to the angular velocity, including the sign representing the rotating direction, wherein $\Delta f_0$ is the reference beat frequency at the standstill state.

In the angular velocity range II', the signal proportional to the absolute value of the angular velocity is obtained from the frequency $\Delta f_b$ of the beat signal of the semiconductor ring laser 12 and the rotating direction may be determined by discriminating whether the frequency of the beat signal of the semiconductor ring laser 12 increases ($\Omega$ being positive) or decreases ($\Omega$ being negative) from $\Delta f_0$. However, this method cannot be used in an angular velocity range where $\Omega$ is negative and a is large enough to satisfy $\Delta f > \Delta f_0$. This drawback can be prevented by determining the rotating direction from the value of $f_-$ in such a case. Note that $\Omega$ is positive for $f_- \leq \Delta f_0$, while $\Omega$ is negative when $f_- < \Delta f_{c-}$ wherein $\Delta f_{c-}$ is the reference frequency shown in FIG. 3B.

Figure 8:
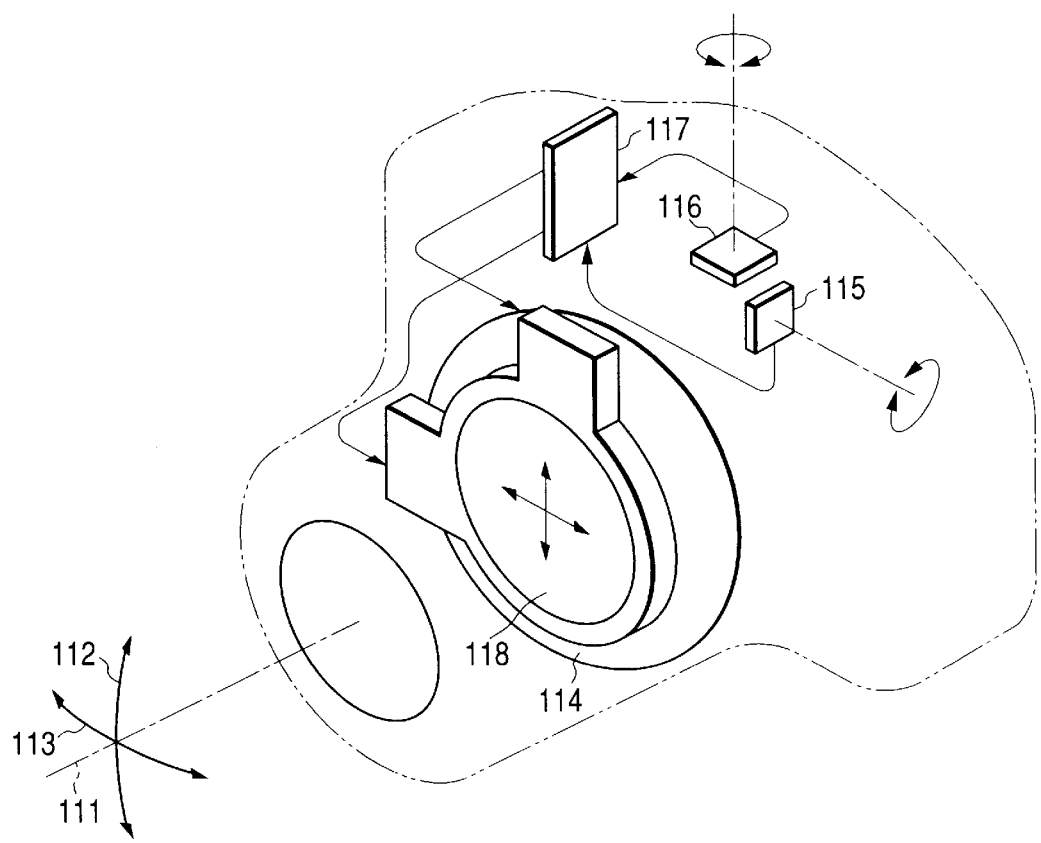
FIG. 8 is a schematic view of a camera with antivibration function based on the detection of rotation by the optical gyro of the first embodiment.

FIG. 8 shows a compact camera equipped with an antirotation system utilizing the gyro of the present embodiment. The camera is provided with a function of rotation compensation, against the pitch and the yaw, respectively indicated by arrows 112 and 113, with respect to an optical axis 111. Correction means 114, vibration detecting devices 115, 116 each including a gyro of the present embodiment and a driving circuit thereof in a package, a camera microcomputer 117, and a correction lens 118 are also shown.

Output signals from the rotation detecting devices 115, 116 respectively correspond to the angular velocities of the pitch and yaw of the camera. These signals are entered into microcomputer 117. When a release button of the camera is fully depressed, the microcomputer 117 executes a correction on the signals according to the focal length and the object distance, and drives the correction means 114 with such signals. In response to the driving signals, the correction means 114 moves the correction lens 118 two-dimensionally in a plane perpendicular to the optical axis, thereby compensating the rotation and avoiding the error in phototaking operation, which results from the rotation of the camera.

The vibration detecting apparatus utilizing the gyro of the present embodiment, being compact and of a low electric power consumption, is capable of constructing an antirotation system adapted for use in a compact camera.

EXAMPLE 2

Figure 4:
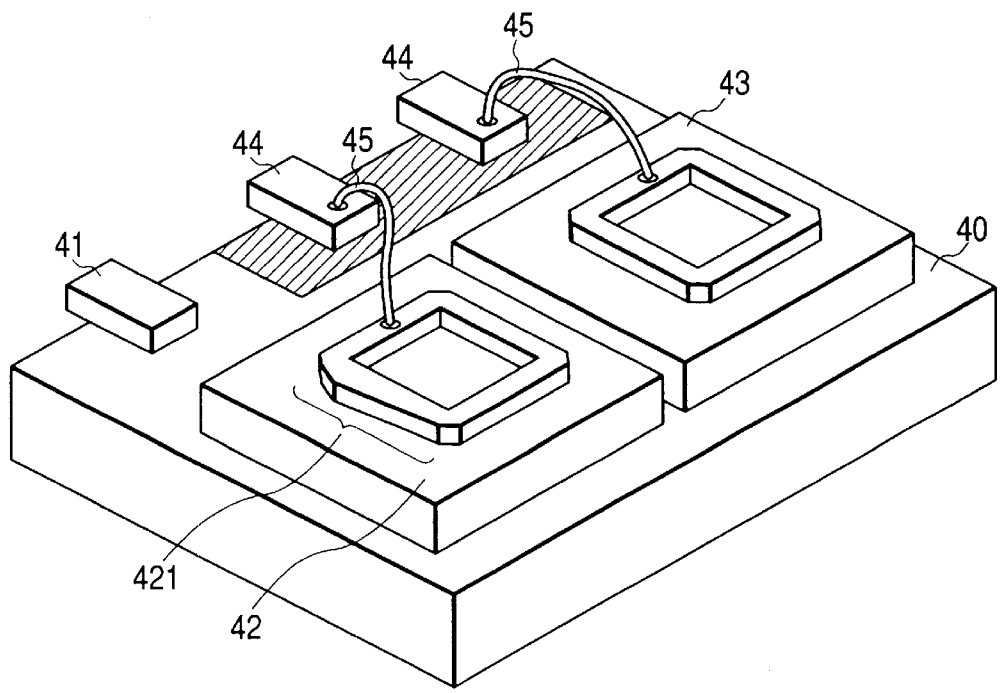
FIG. 4 is a schematic view of an optical gyro constituting a second embodiment of the present invention.

FIG. 4 is a perspective view showing another example of the optical gyro of the present invention, wherein multiple semiconductor ring lasers are provided in a casing.

In FIG. 4, a stem 40 employed as a casing, a common electrode 41 connected to the stem, semiconductor ring lasers 42, 43, electrodes 44 corresponding to the semiconductor ring lasers 42, 43, and wires 45 for connecting the electrodes 44 respectively with the semiconductor ring lasers 42, 43 are shown. The semiconductor ring lasers 42, 43 have a layer structure, which is the same as that of the semiconductor ring laser of the first embodiment. The semiconductor ring laser 42 is provided with a tapered portion 421 consisting of a first portion in which the width of the optical wave guide gradually increases along the propagating direction of the clockwise propagating laser light and a second portion in which the width of the optical wave guide gradually decreases. The ring resonator semiconductor portion 43 is not provided with such tapered portion. The semiconductor ring laseres 42, 43 have the same ratio of the area surrounded by the resonator to the circumferential length of the resonator.

In the above-described configuration, the substrate of the semiconductor ring lasers 42, 43 is soldered as a common electrode to the stem 41, while the electrodes of the semiconductor lasers 42, 43 at the side of the capping layer are respectively connected to the electrodes 44 through the wires 45.

Figure 5:
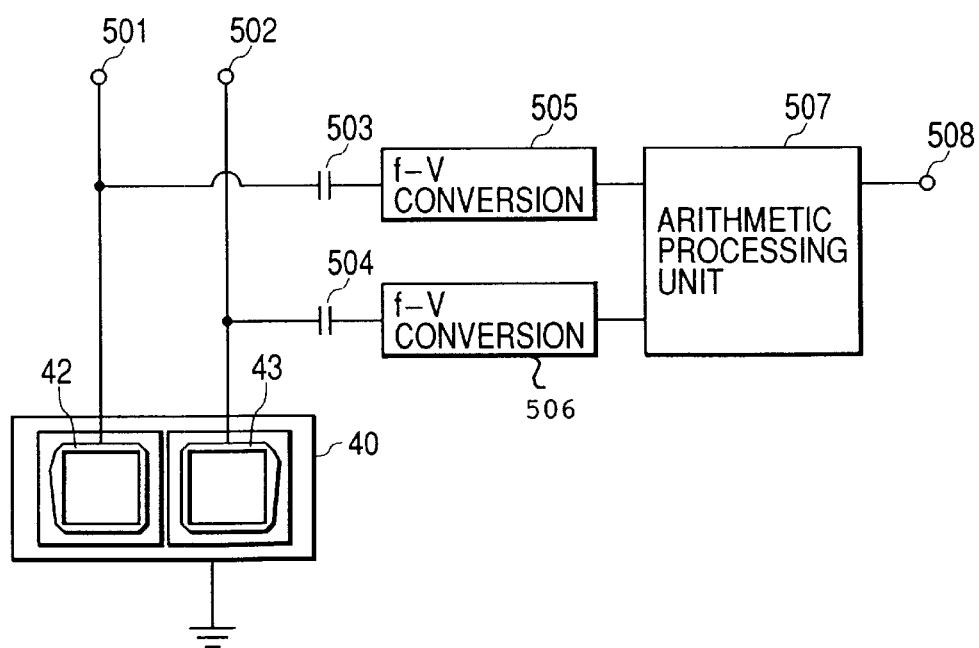
FIG. 5 is a view showing driving and signal processing circuits of the optical gyro of the second embodiment.

Under constant-current driving. the voltage change between the terminals is detected in each semiconductor ring laser. A circuit shown in FIG. 5 is employed in order to execute the current injection and the voltage detection by the same electrode. In FIG. 5, a casing 40 of the optical gyro of the present invention, semiconductor ring lasers 42, 43, drive current input terminals 501, 502, coupling capacitors 503, 504, f-V conversion circuits 505, 506, a signal processing unit 507 and a signal output terminal 508 are shown.

The terminals 501, 502 are connected to a power source to drive the semiconductor ring lasers 42, 43 under a constant current above the oscillation threshold current. In each of the semiconductor ring lasers 42, 43 with the injected current above the oscillation threshold a clockwise propagating laser light and a counterclockwise propagating laser light are generated. Particularly in the semiconductor ring laser 42 with the tapered portion, the clockwise and counterclockwise propagating laser lights are indpendent and have different oscillation frequencies, thereby generating a beat light signal.

The relationship between the angular velocity $\Omega$ of the gyro and the frequency $\Delta f$ of the beat signal from each semiconductor ring laser is the same as that in the foregoing first embodiment (cf. FIGS. 3A and 3B).

The angular velocity is detected by the signal processing circuit shown in FIG. 5 in the following manner. Signals indicating the voltage changes in the semiconductor ring lasers transmit through the capacitors 503, 504, and are converted by the f-V conversion circuits 505, 506 into voltages corresponding to the frequencies of the beat signals. Then an angular velocity signal 508 is obtained by the following processing in the processing circuit 507.

As in the first embodiment, the angular velocity is divided into a range I: $\Omega<\Omega a$, a range II: $\Omega a \leq \Omega <-\Omega c$, a range III: $-\Omega c \leq \Omega-\Omega c$, and a range IV: $\Omega c<\Omega$.

The process for obtaining the angular velocity in the angular velocity ranges I, II and IV is the same as in the first embodiment. The present example does not execute the feedback control. Instead, in order to obtain the angular velocity in the angular velocity range III, the variation of the beat frequency in the standstill state is treated in the following manner.

In the angular velocity range II, as the sum $f_+$ of the frequency of the beat signal from the semiconductor ring laser 42 and that from the semiconductor ring laser 43 corresponds to the beat frequency $\Delta f_0$ of the semiconductor ring laser 42 in the standstill state, such sum is memorized as the latest $\Delta f_0$. Also in the angular velocity range IV, as the difference $f_-$ of the frequency of the beat signal from the semiconductor ring laser 42 and that from the semiconductor ring laser 43 corresponds to the beat frequency $\Delta f_0$ of the semiconductor ring laser 42 in the standstill state, such sum is memorized as the latest $\Delta f_0$.

In the angular velocity range III, the aforementioned amount $\Delta f_0$ corresponding to the beat frequency in the standstill state is subtracted from the frequency of the beat signal of the semiconductor ring laser 42 to obtain a signal proportional to the angular velocity, including the sign representing the rotating direction.

Thus, in the angular velocity ranges II to IV, the angular velocity can be obtained by determining the latest $\Delta f_0$ by signal processing and utilizing such value for measuring the angular velocity in the angular velocity range III.

In the foregoing a case of utilizing a stem as the casing has been explained, but the casing in the present invention may be assume any form capable of hybrid mounting of maltiple semiconductor ring lasers, such as a box. Also in the foregoing two examples, the ring resonator of the semiconductor laser is rectangular, but it may assume any closed form such as circular or triangular.

EXAMPLE 3

Figure 6:
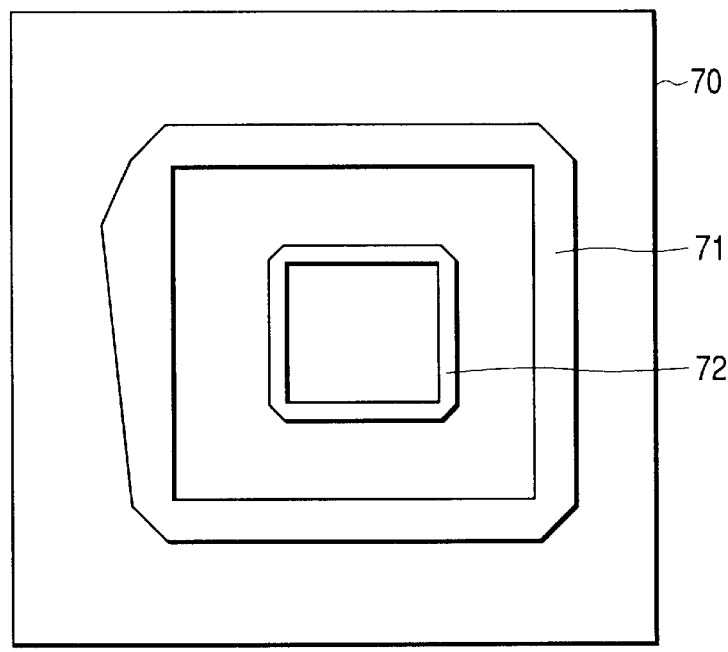
FIG. 6 is a schematic plan view of an optical gyro constituting a third embodiment of the present invention.

FIG. 6 shows another example of the optical gyro of the present invention, wherein shown are an optical gyro 70 of the present invention, a semiconductor ring laser 71 with a tapered portion, a semiconductor ring laser 72 without a tapered portion which is formed inside the resonator of the semiconductor laser 71. The layer structure of the laser is the same as that in the first embodiment. In the semiconductor ring lasers 71 (outer) and 72 (inner) of the present embodiment, the ratio R of the areas surrounded by the resonator to the circumferential length L thereof has the following relation:

$$R=(S/L)_{outer}/(S/L)_{inner}=2 \tag{5}$$

Figure 7:
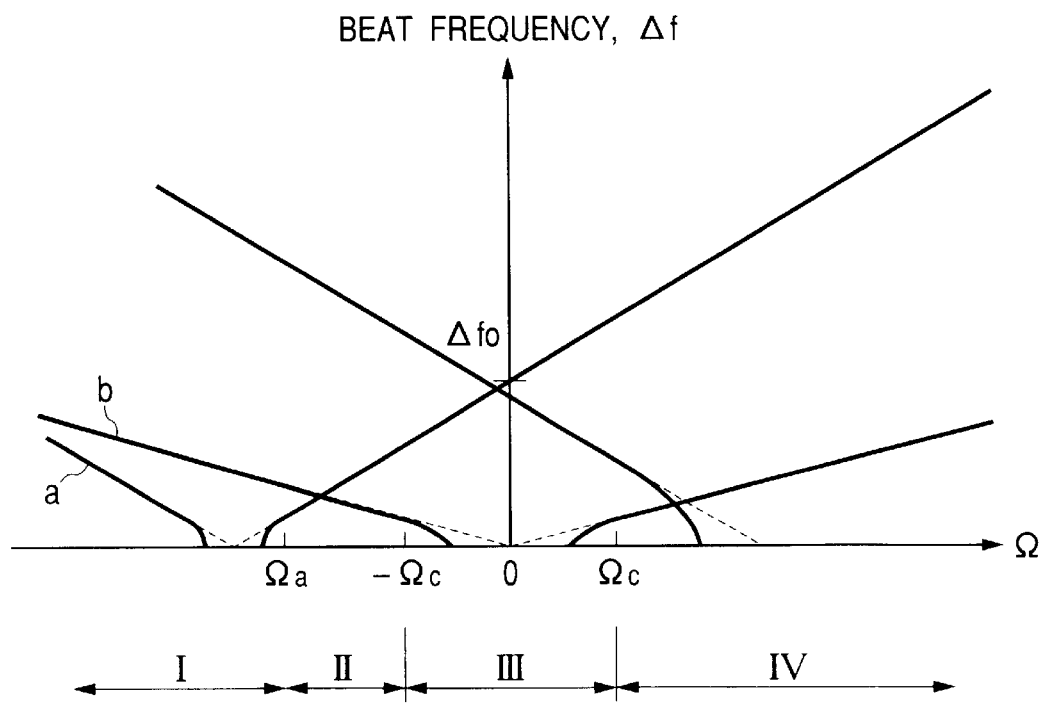
FIG. 7 is a chart showing the relationship of the frequency of a beat signal and the angular velocity in the optical gyro of the third embodiment.

FIG. 7 shows the relationship between the angular velocity $\Omega$ and the beat frequency $\Delta f$ when the semiconductor ring lasers constituting the gyro oscillate by current injection, wherein lines a and b respectively indicate the characteristics of the semiconductor ring lasers 71, 72. The absolute value of the inclination of the beat frequency $\Delta f$ in a rotated state as a function of the angular velocity $\Omega$ is represented by $2(1/\lambda_1+1/\lambda_2)S/L$ as indicated by the equation (4), so that the ratio R of the inclinations becomes 2 between the two semiconductor ring lasers 71, 72.

As in the first embodiment, the angular velocity is divided into a range I: $\Omega<\Omega a$, a range II: $\Omega a \leq \Omega <-\Omega c$, a range III: $-\Omega c \leq \Omega \leq -\Omega c$, and a range IV: $\Omega c<\Omega$. I incidates an angular velocity range in which the influence of non-linearity by the lock-in phenomenon becomes large in the semiconductor ring laser 71 and III indicates an angular velocity range in which the influence of non-linearity by the lock-in phenomenon becomes large in the semiconductor ring laser 72.

In the angular velocity range I, the beat signal from the semiconductor ring laser 72 is used to obtain the absolute value of the angular velocity. Also, -1 is multiplied to represent the rotating direction. Then R=2 is multiplied to correct the influence of the S/L ratio to obtain a signal output.

In the angular velocity ranges II, III and IV, the beat frequency $\Delta f_0$ in the standstill state is subtracted from the beat signal of the semiconductor ring laser 71 to obtain a signal proportional to the angular velocity, including the sign representing the rotating direction.

In the angular velocity range II, a weighted addition is executed on the frequency $\Delta f_a$ of the beat signal of the semiconductor ring laser 71 and the frequency $\Delta f_b$ of that of the semiconductor ring laser 72 to obtain $f_+=\Delta f_a+R\Delta f_b=\Delta f_a+2\Delta f_b$, wherein the weighting is taken as 1:R. The amount $f_+$, corresponding to the beat frequency $\Delta f_0$ of the semiconductor ring laser 71 in the standstill state, is used as a new $\Delta f_0$ in the signal processing thereafter.

In the angular velocity range IV, a weighted subtraction is executed to obtain $f_-=\Delta f_a-R\Delta f_b=\Delta f_a 2\Delta f_b$. As in the angular velocity range II, the amount $f_-$, corresponding to the beat frequency $\Delta f_0$ of the semiconductor ring laser 71 in the standstill state, is used as a new $\Delta f_0$ in the signal processing thereafter.

In the ranges II and IV, the embodiment 1 obtains the signal proportional to the angular velocity based on the beat signal of the ring laser without the tapered portion, but, in the present example, such signal is obtained from the beat signal of the semiconductor ring laser 71 with the tapered portion. The reason to use the heat signal from the semiconductor ring laser 71 is that the inclination of Δf as a function of the angular velocity Ω is larger than that of the semiconductor ring laser 72, thereby providing a larger change of the signal and improving the S/N ratio.

As explained in the foregoing, the signal proportional to the angular velocity, including the sign representing the rotating direction, can be obtained by processing the beat frequencies of the two semiconductor ring lasers. Also highly stable optical gyro was obtained by repetitive renewing the amount corresponding to the beat frequency in the standstill state.

In the foregoing three examples, a case of executing constant-current driving and detecting the variation in the terminal voltage corresponding to the angular velocity of the device has been explained, but it is also possible to detect the angular velocity, as will be apparent from the principle to detect the variation in the device impedance, which results from the angular velocity of the device during its activated state, for example by executing constant-voltage driving and detecting the variation in the current, or by measuring the change in the impedance by other impedance measuring methods.

As explained in the foregoing, the present invention provides an optical gyro capable of detecting the angular velocity of rotation and the rotating direction in precise manner, and a signal processing method therefor.

There is also provided a driving method for an optical gyro, capable of observing the variation in the impedance of the device by a simple circuit configuration and allowing easy connection with various signal processing circuits, thereby enabling detection of the angular velocity of rotation and the rotating direction in precise manner.

(2) In the following a configuration employing three ring lasers will be explained.

Second Embodiment

Figure 9A:
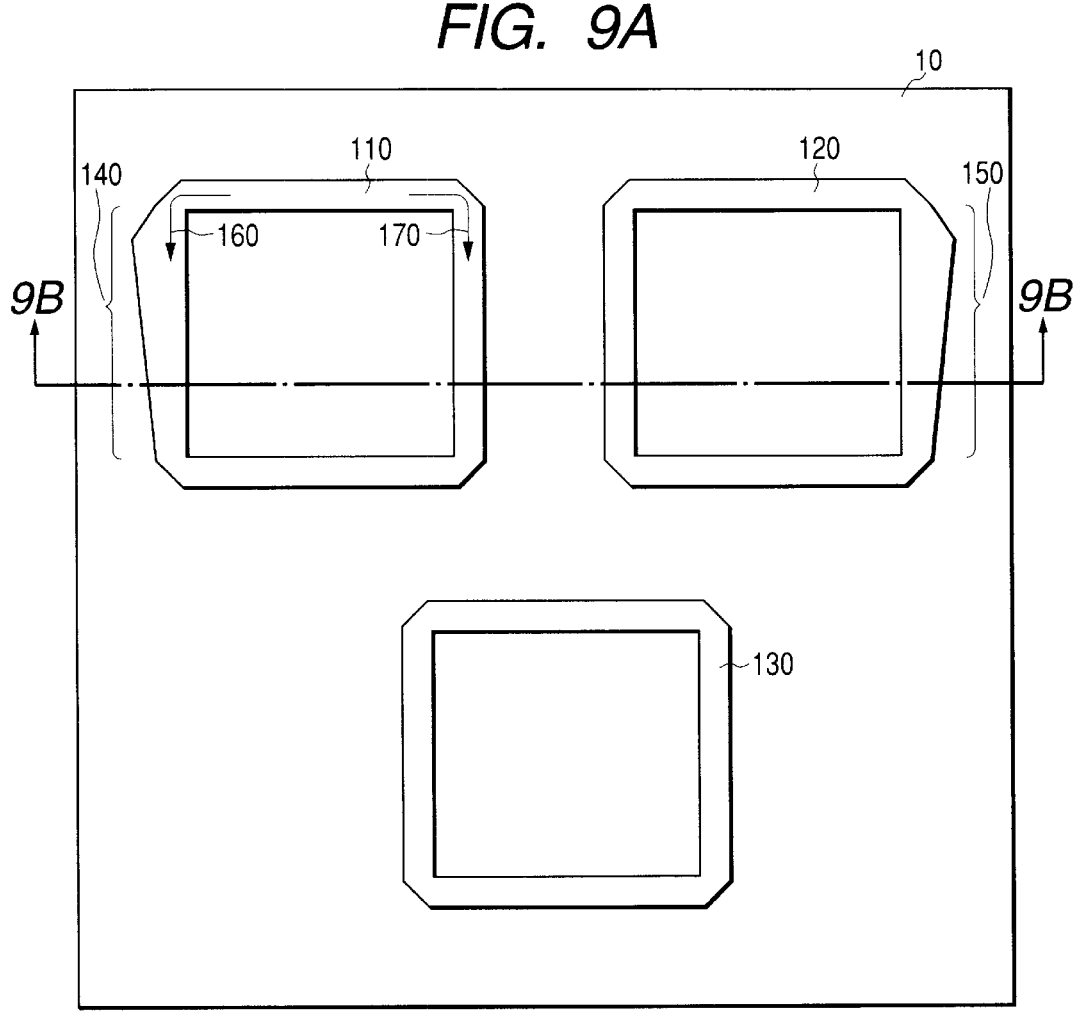
FIG. 9A is a schematic view showing an optical gyro constituting a second embodiment of the present invention.
Figure 9B:
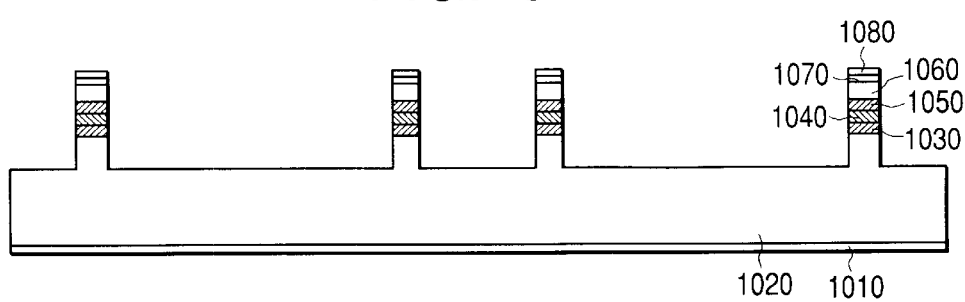
FIG. 9B is a cross-sectional view along a line 9B—9B in FIG. 9A.

FIGS. 9A and 9B show respectively a plan view and a cross-sectional view of a second embodiment of the optical gyro of the present invention, wherein an optical gyro 100 of the present invention is provided with semiconductor ring lasers 110, 120, 130, portions (tapered portions) 140, 150 showing a change in the width of the wave guide and provided in parts of the optical wave guide. In each semiconductor ring laser, there exist a counterclockwise propagating mode 160 and a clockwise propagating mode 170.

The three semiconductor ring laser elements 110, 120, 130 were prepared in the following manner.

FIG. 9B is a cross-sectional view of the device along a line 9B—9B in FIG. 9A, and a multi-layered semiconductor structure shown therein was at first prepared by metalloorganic vapor phase epitaxy. More specifically, on an n-InP substrate 1020, there were crystalline grown an undoped InGaAsP light guide layer 1030 of a bandgap wavelength of 1.3 μm (0.15 μm thick), an undoped InGaAsP active layer 1040 of a bandgap wavelength of 1.55 μm (0.1 μm thick), an undoped InGaAsP light guide layer 1050 of a bandgap wavelength of 1.3 μm (0.15 μm thick), a p-InP clad layer 1060 (1.5 μm thick) and a p-InGaAs cap layer 1070. Then photoresist was coated or the InGaAs cap layer 1070, then exposed to a mask pattern, and finally developed to obtain a resist pattern in the shape of the ring resonator. Then reactive ion etching with chlorine gas was conducted to form a semiconductor ring laser consisting of a ridge wave guide with a height of 3 μm. Cr/Au were evaporated on the ridge wave guide to constitute an anode 1080. On the lower face of the wafer, AuGe/Ni/Au were evaporated to form a cathode 1010. The metals were formed into an alloy in hydrogen atmosphere to obtain ohmic contact between the electrodes and the semiconductor.

In the following the shape of the wave guide constituting the ring wave guide will be explained in detail. Each of the semiconductor ring lasers 110, 120 has an asymmetrical shape. More specifically, each of the tapered portions 140, 150 consists of a first portion in which the width of the optical wave guide increases along the propagating direction of the counterclockwise propagating laser light and a second portion in which the width of the optical wave guide decreases, and the first portion and the second portion have different lengths. Particularly in the illustrated example, the first portion is made extremely short. The resonators of the semiconductor ring lasers 110 and 120 are mutually in mirror symmetry.

The semiconductor ring lasers 110, 120, 130 formed on the same substrate are mutually so distanced that the respective laser lights mutually coupling. The distance was selected at about 15 μm or larger in order to avoid the coupling of evanescent light. Also in the asymmetrical tapered portion, laser light is emitted from the wave guide due to mode conversion. As a result, the tapered portions are positioned so as not to be mutually face-to-face or not to be on the same axis. Otherwise, between the semiconductor ring lasers, the semiconductor layer may be left unetched to form an absorbent member. Also on the lateral and upper faces of such absorbent member, an insulating film and an electrode metal may be provided to form a light shielding member. Also an insulating film and an electrode metal may be provided on the lateral face of the device to constitute a light shielding member. Such light shielding member may be positioned in such inclined manner that the light reflected on the surface thereof does not return to the semiconductor ring laser. Such device arrangement, absorbent member and/or light shielding member allows to reduce the interaction between the semiconductor ring lasers. The reflected light, which couples the clockwise and counterclockwise propagating laser lights, are sufficiently reduced whereby the lock-in phenomenon can be prevented.

Figure 10:
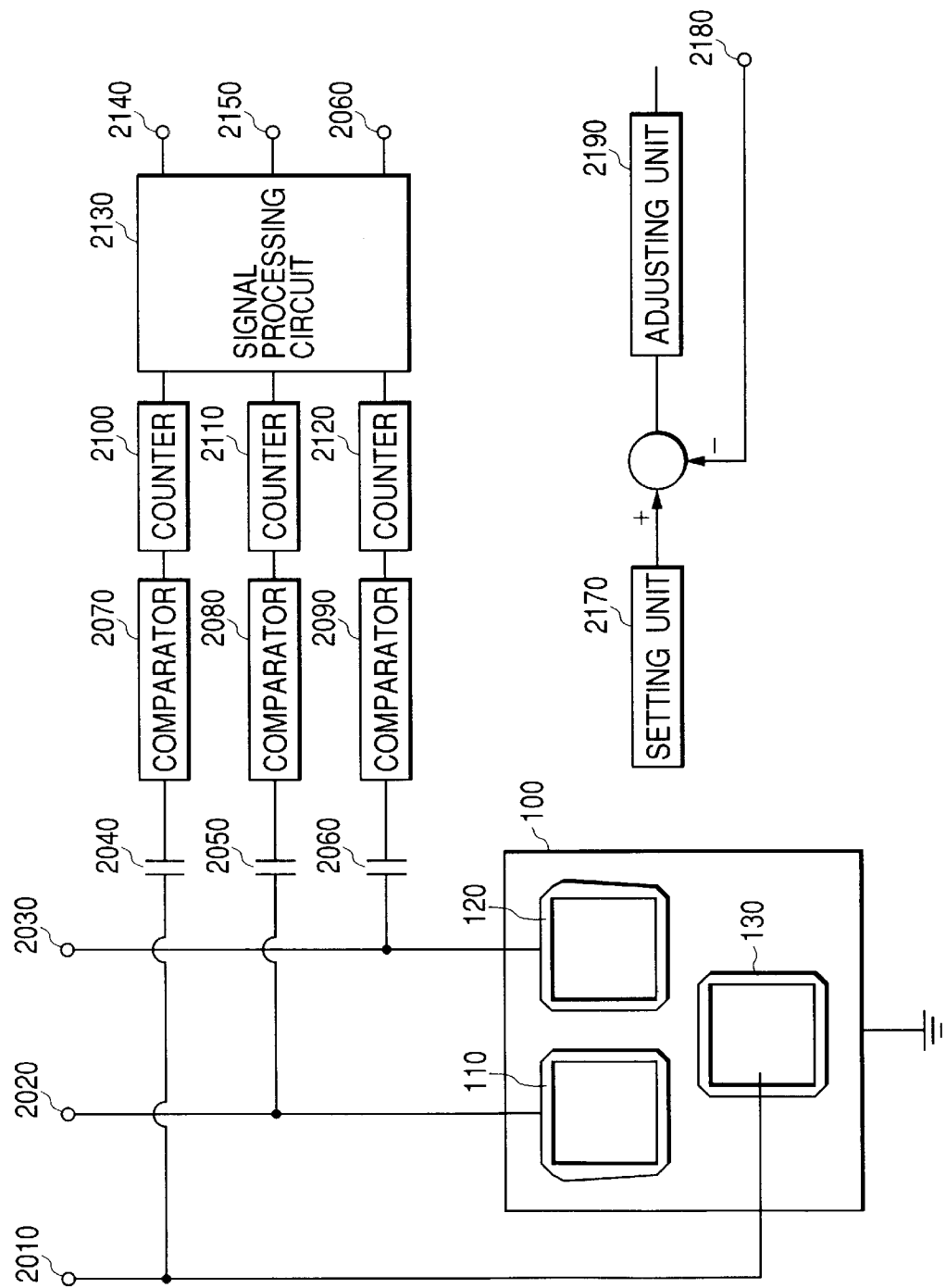
FIG. 10 is a view showing driving and signal processing circuits of the optical gyro of the second embodiment.

A circuit shown in FIG. 10 is employed in order to independently inject currents into the semiconductor ring lasers 110, 120, 130 and to detect the respective terminal voltages.

In FIG. 10, an optical gyro 100 of the present invention, semiconductor ring lasers 110, 120, 130, driving current input terminals 2010, 2020, 2030 coupling capacitors 2040, 2050, 2060, comparators 2070, 2080, 2090, counters 2100, 2110, 2120, an arithmetic processing circuit 2130, an output terminal 2140 and error signal output terminals 2150, 2160 are shown.

The terminals 2010, 2020, 2030 are connected to a power source to drive the semiconductor ring lasers under a constant current above the oscillation threshold current. In the semiconductor ring laser 110 (and 120) under the injected current above the oscillation threshold, there independently exist a clockwise propagating laser light and a counterclockwise propagating laser light.

The clockwise propagating laser light and the counterclockwise propagating laser light have different laser oscillation frequencies at the standstill state, owing to the function of the asymmetrical tapered portion of the semiconductor ring laser 110 (and 120) as will be explained in the following. The laser light propagates in the optical wave guide with being totally reflected at the interface thereof, but a wave guide loss is generated in the tapered portion because the angle of incidence upon the interface of the optical wave guide changes therein. The loss becomes different according to the propagating direction because of the difference in the angle of incidence in the tapered portion, so that the resonator loss depends on the propagating direction.

Since the resonator loss is different depending on the propagating direction of the laser light, the oscillation threshold of the semiconductor ring laser also becomes different depending on the propagating direction, so that, in a state where two laser lights simultaneously exist, the photon density of the becomes different in the two laser lights by the nonlinear optical effect. Following relations exist between the oscillation frequencies $f_j$ and the photon density $S_j$ of the coexisting two laser lights (modes), so that a difference in the photon densities results in a difference in the oscillation frequencies:

$$2\pi f_1 + d\Phi_1/dt = \Omega + \sigma_1 - \rho_1 S_1 - \tau_{12} S_2$$
$$2\pi f_1 + d\Phi_2/dt = \Omega + \sigma_2 - \rho_2 S_2 - \tau_{21} S_1 \qquad (5)$$

wherein $\Phi_i$ is a phase, $\Omega$ is a resonant angular frequency, $\sigma_i$ is a mode pulling coefficient, $\rho_i$ is a self mode pushing coefficient, and $\tau_{ij}$ is a cross mode pushing coefficient, and $i, j = 1, 2; i \neq j$. As the oscillation frequencies $f_{10}$ and $f_{20}$ of the laser lights are different in the standstill state, a beat of a frequency $\Delta f_0 = f_{20} - f_{10}$ is generated in the standstill state.

On the other hand, the semiconductor ring laser 130 shows laser oscillation with an injected current above the oscillation threshold. In the semiconductor ring laser 130 without the tapered portion, the two modes in the standstill state have the same photon density, and the same oscillation frequency.

When the semiconductor ring lasers rotate clockwise with an angular velocity $\Omega$, the oscillation frequency of the clockwise propagating first laser light decreases in comparison with the oscillation frequency $f_{10}$ in the non-rotating state, by:

$$\Delta f_1 = 2S\Omega/(\lambda_1 L) \qquad (6)$$

wherein S is an area surrounded by the ring resonator, L is a length of optical path, and $\lambda_1$ is a wavelength of the clockwise propagating first laser light in the medium. At the same time, the oscillation frequency of the counterclockwise propagating second laser light decreases, in comparison with the oscillation frequency $f_{20}$ in the non-rotating state, by:

$$\Delta f_2 = 2S\Omega/(\lambda_2 L) \qquad (7)$$

wherein $\lambda_2$ is a wavelength of the laser light in the medium.

As the clockwise propagating first laser light and the counterclockwise propagating second laser light are simultaneously present in the ring resonator, a beat light of a frequency corresponding to the difference of the oscillation frequencies of the first and second laser lights is generating. The beat frequency $\Delta f$ in the rotating state is represented by:

$$\Delta f = f_2 - f_1 \qquad (8)$$
$$= f_{20} - f_{10} + (\Delta f_2 + \Delta f_1)$$
$$= f_{20} - f_{10} + (2S\Omega/L) \times (1/\lambda_2 + 1/\lambda_1)$$

The beat light induces a pulsation of the inversion with the same frequency $\Delta f$, thereby varying the impedance between the terminals. Therefore, for the constant-current driving, a variation of voltage of the aforementioned frequency $\Delta f$ in the voltage between the terminals is observed. However, since the observab frequency is always positive, $|\Delta f|$ can be obtained.

If the oscillation frequencies $f_{10}$ and $f_{20}$ of the laser lights are different in the standstill state as indicated by the lines, a beat $\Delta f_0 = f_{20} - f_{10}$ is generated in the standstill state. When the gyro is rotated, the beat frequency increases or decreases according to the rotating direction, as indicated by linear portions a, c in FIG. 11.

Figure 11:
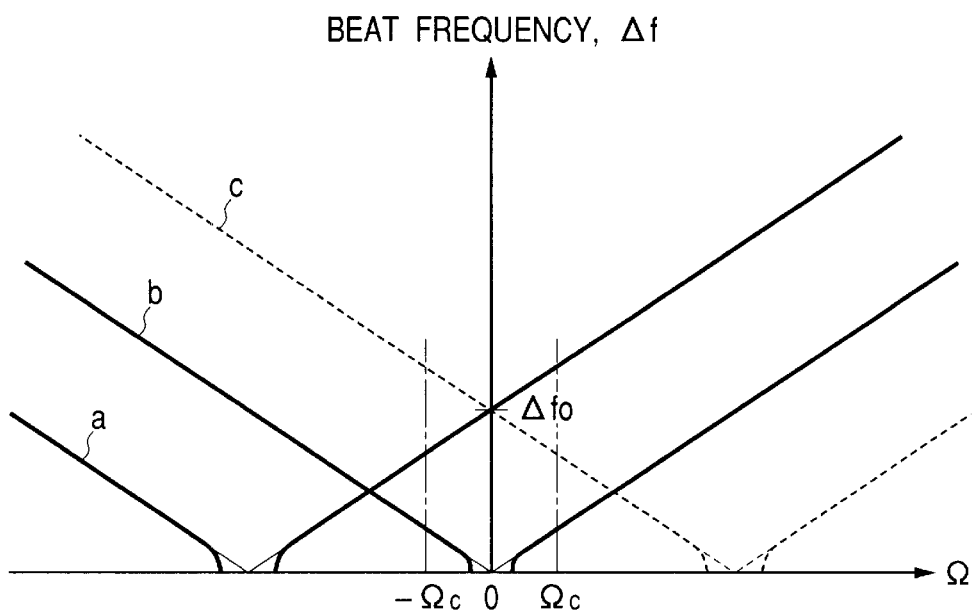
FIG. 11 is a chart showing the relationship of the frequency of a beat signal and the angular velocity in the optical gyro of the second embodiment.

Now reference is made to FIG. 11 for explaining the relationship between the angular velocity and the frequency of the voltage signal obtained from the semiconductor ring laser.

In FIG. 11, linear portions of solid lines a, c and broken-lined extensions thereof indicate $\Delta f$ represented by the equation (8). When the difference of the oscillation frequencies of the two laser lights is less than a threshold value (indicated by broken lines), a strong coupling between the two laser lights is generated whereby the lasers cannot oscillate in independent two modes. In such a state, the periodical variation cannot be observed in the light beat and in the voltage.

In such a situation, the relationship between the angular velocity and the voltage signal becomes as indicated by solid lines in FIG. 11. A solid line a indicates a case $(f_{20}-f_{10})>0$, while a broken line c indicates a case $(f_{20}-f_{10})<0$. In both cases, $\Delta f_0 = |f_{20}-f_{10}|$. Also a solid line b indicates a case $(f_{20}-f_{10})=0$. This is an example for strong coupling of the two modes in the standstill state due to the backward scattering. If the backward scattering is weak and the two laser lights are weakly coupled even in the standstill state, a light beat is generated by the rotation.

Under the same driving condition, the semiconductor ring lasers 110, 120 in mutual mirror symmetry has a relationship between the angular velocity and the frequency of the voltage signal indicated by a, c in FIG. 11, symmetrical with respect to the angular velocity $\Omega$. Also the semiconductor lasers have the same beat frequency $\Delta f_0$ in the standstill state. Also, a solid line b indicates the characteristics of the semiconductor ring laser 130 without the tapered portion. The three semiconductor ring lasers 110, 120, 130 have the same ratio S/L of the area S surrounded by the resonator to the optical path length L of the ring resonator, in such a manner that the inclination of the beat frequency as a function of the angular velocity becomes the same.

The signal processing circuit shown in FIG. 10 detects the angular velocity in the following manner. The signals indicating the variation in voltage, from the respective semiconductor ring lasers, transmit capacitors 2040, 2050, 2060 and such frequency signals are shaped into rectangular signals by the comparators 2070, 2080, 2090. The numbers of pulses within a predetermined time are counted by the counters 2100, 2110, 2120. The pulse numbers from the respective devices are injected in the arithmetic processing circuit 2130 and are processed in the following manner to obtain an angular velocity signal and an error signal for adjusting the drive current.

At first in advance as a reference, an angular velocity $\Omega c$, at which the lock-in can be negligible in the semiconductor ring laser 130 is set. The processing in the signal processing circuit 2130 is changed in a range $|\Omega|<\Omega c$, and in a range $\Omega c \leq |\Omega|$.

In the range $|\Omega|<\Omega c$, the difference $f_-$ in the beat frequencies of the first and second semiconductor ring lasers 110, 120 are represented as:

$$f_- = (2S\Omega/L) \times (1/\lambda_{1.cw} + 1/\lambda_{1.ccw} + 1/\lambda_{2.cw} 1/\lambda_{2.ccw}), \qquad (9)$$

which is proportional to the angular velocity, wherein $\lambda_{j,cw}$ and $\lambda_{j,ccw}$ are the oscillation wavelengths of the clockwise and counterclockwise propagating laser lights in a j-th semiconductor ring laser and are mutually approximately the same. Therefore such frequency difference is divided by 2 to obtain a signal output proportional to the angular velocity, including the sign representing the rotating direction. Also a sum $f_+$ of the signal frequencies of the semiconductor ring lasers 110 and 120 is calculated. This amount, which is represented by:

$$f_+ = \Delta f_{o1} + \Delta f_{o2},$$

is independent of the angular velocity of the gyro. $\Delta f_{oj}$ is the beat frequency of the j-th semiconductor ring laser in the standstill state. If this value changes, the beat frequency at the standstill state varies in at least either of the two semiconductor ring lasers, so that the angular velocity detection according to the equation (9) includes an error. Therefore, such amount is taken out as error signals 2150, 2160 which are fed back to a feedback control circuit for the driving current. In this manner, the sum signals 2150, 2160 of the beat frequencies are employed as error signals for the amount set in advance in the setting unit 2170 (an initial value of $f_+$ corresponding to twice of the beat frequency in the standstill state). The adjusting unit 219 regulates the driving currents for the semiconductor ring lasers accordingly.

An increase in the driving current for the ring laser above the threshold tends to increase the difference the light intensities between the two modes shown in the equations (5), thereby increasing the beat frequency in the standstill state. Therefore the control can be executed so as to increase or decrease the drive current respectively if the beat frequency in the standstill state decreases or increases.

In a range $\Omega c \leq |\Omega|$, the signal frequency from the semiconductor ring laser 130 without the tapered portion is proportional to the absolute value of the angular velocity and is not influenced by the variation in the beat frequency in the standstill state as indicated by $(2S|\Omega|/L) \times (1/\lambda_{13,cw} + 1/\lambda_{13,ccw})$ and such signal frequency is therefore taken as the signal output. Also the signal frequencies from the semiconductor ring lasers 110, 120 can be compared to determine the rotating direction (sign of $\Omega$). The rotating direction may otherwise be determined by comparing the predetermined beat frequency $\Delta f_{ref}$ in the standstill state with the signal frequency of the semiconductor ring laser 110 or 120. In the range $\Omega c \leq |\Omega|$, the correct rotating direction can be obtained even if $\Delta f_{ref}$ is displaced from the real beat frequency $\Delta f_{o1}$ (or $\Delta f_{o2}$) in the standstill state if such displacement is smaller than $4S\Omega c/L\lambda$.

Also the difference between the angular velocity, measured respectively utilizing the equation (8) for the beat frequencies obtained from the semiconductor ring lasers 110, 120 and the angular velocity obtained from the semiconductor ring laser 130 is taken as an error signal to execute feedback control on the driving conditions of the semiconductor ring lasers 110, 120 thereby suppressing the variation in the beat frequency in the standstill state.

When the absolute value of the angular velocity becomes larger, and a lock-in phenomenon exists in either of the semiconductor ring lasers 110, 120 with the tapered portion, the above-mentioned feedback control is interrupted in such device. Therefore, separate output error signals 2150, 2160 are provided for respectively controlling the semiconductor ring lasers 110, 120.

As explained in the foregoing, when the angular velocity is small, the subtraction of the beat frequencies allows to provide the signal proportional to the angular velocity, including the sign representing the rotating direction, without utilizing the beat frequency at the standstill state, taken as the reference value. At the same time, feedback control for stabilizing the beat frequency in the standstill state is executed regardless of the angular velocity, thereby providing an optical gyro of excellent stability. Also if the angular velocity is large, the signal proportional to the absolute value of the angular velocity is obtained from the semiconductor ring laser without the tapered portion. In such a case, the rotating direction is obtained by comparing of the signals from the semiconductor ring lasers with the tapered portions. Also in such a situation, feedback control is executed on the driving conditions of the semiconductor ring lasers with the tapered portions, taking the beat frequency of the semiconductor ring laser without the tapered portion as the reference, thereby providing an optical gyro of excellent stability.

In the present embodiment InGaAsP/InP semiconductor materials has been employed, but other materials capable of causing laser oscillation by current injection, such as GaAs, ZnSe or InGaN may also be employed. Also a case where the feedback control system controls the driving current has been explained, but it is also possible to stabilize the beat frequency in the standstill state by feedback control with a temperature adjusting circuit of the device. In such case, a decrease in the threshold of the device by lowering the temperature thereof tends to increase the difference in the light intensities between the two modes in the same driving current, thereby increasing the beat frequency in the standstill state. Therefore the control can be executed so as to raise or lower the device temperature respectively if the beat frequency in the standstill state increases or decreases.

For the feedback control on the driving conditions of the semiconductor ring lasers 110, 120 with the tapered portions, the beat frequency of the semiconductor ring laser 130 without the tapered portion as the reference in the range $|\Omega| > \Omega c$, there are several method. In addition to the aforementioned method of determining the angular velocity for each device, there is a method to use the difference between the angular velocity obtained from the different in the beat frequencies of the semiconductor ring lasers 110, 120 and the angular velocity obtained from the semiconductor ring laser 130 as the error signal, as in the signal processing in the range $|\Omega| < \Omega c$.

Figure 19:
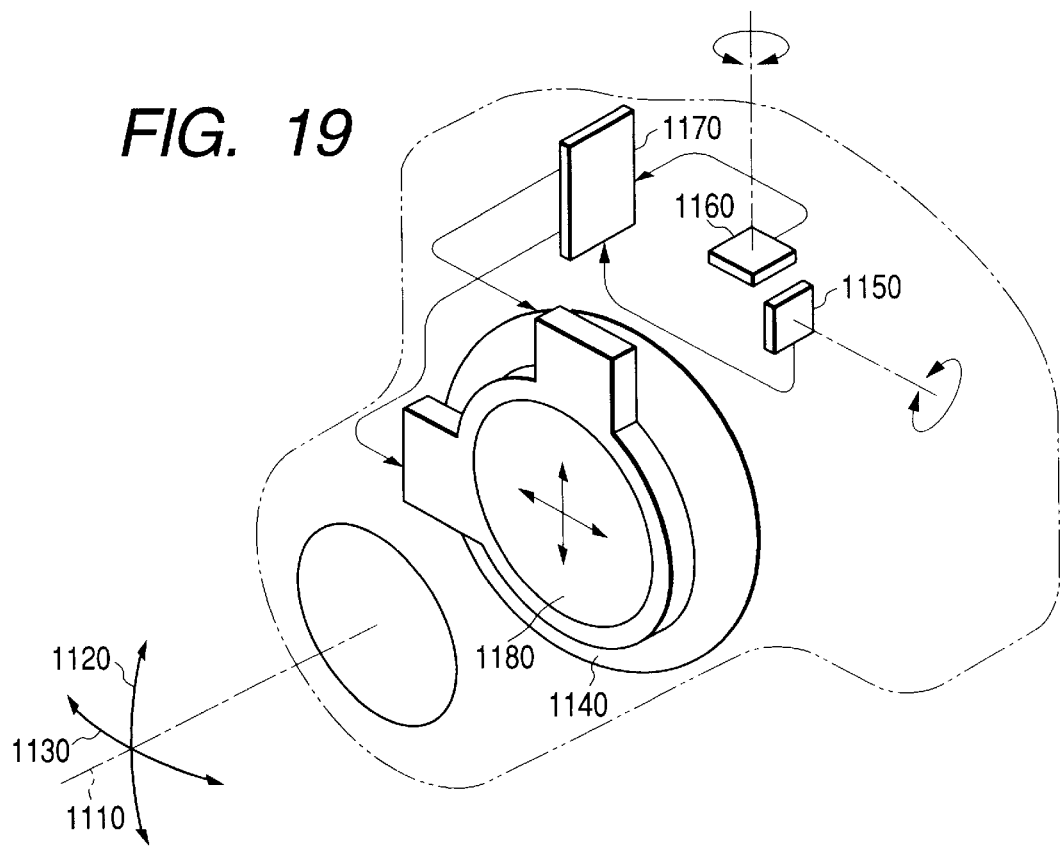
FIG. 19 is a schematic view of a camera with antivibration function based on the detection of rotation by the optical gyro of the second embodiment.

FIG. 19 shows a compact camera equipped with an antirotation system utilizing the gyro of the present embodiment. The camera is provided with a function of rotation compensation, against the pitch and yaw, respectively indicated by arrows 112 and 113, with respect to an optical axis 111. Correction means 114, rotation detecting devices 115, 116 each including a gyro of the present embodiment and a driving circuit thereof in a package, a CPU (camera microcomputer) 117, and a correction lens 118 are also shown.

Output signals from the rotation detecting devices 115, 116 respectively correspond to the angular velocities of the pitch and yaw of the camera. These signals enter into the camera microcomputer 117. When a release button of the camera is fully depressed, the microcomputer 117 executes a correction on the signals according to the focal length and the object distance, and drives the correction means 114 with such signals. In response to the driving signals, the correction means 114 moves the correction lens 118 two-dimensionally in a plane perpendicular to the optical axis, thereby compensating the rotation and avoiding the error in phototaking operation, which results from the rotation of the camera.

The rotation detecting apparatus utilizing the gyro of the present embodiment, being compact and of a low electric power consumption, is capable of constructing an antirotation system adapted for use in a compact camera.

Third Embodiment

Figure 12:
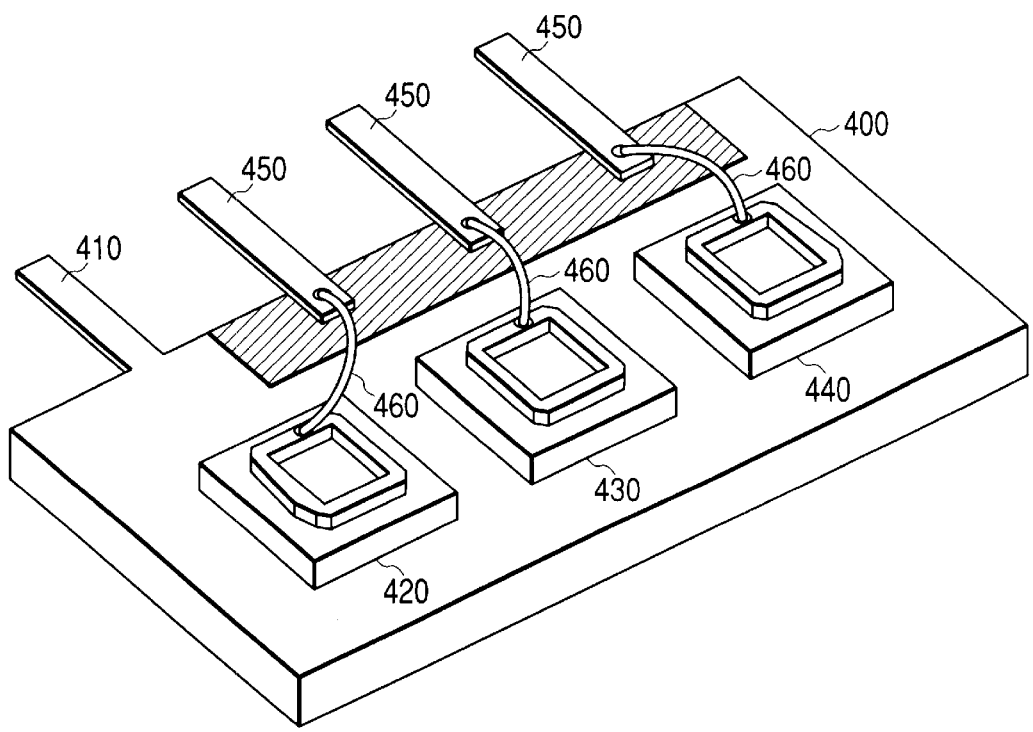
FIG. 12 is a schematic view of an optical gyro constituting a third embodiment of the present invention.

FIG. 12 is a perspective view showing another example of the optical gyro of the present invention, wherein multiple semiconductor ring lasers are provided in a casing.

In FIG. 12, da stem 400 employed as a casing, a common electrode 410 connected to the stem, semiconductor ring lasers 420, 430, 440, electrodes 450 corresponding to the semiconductor ring lasers 420, 430, 440, and wires 460 for connecting the electrodes 450 respectively with the semiconductor ring lasers 420, 430, 440. The semiconductor ring lasers 420, 430, 440 have a layer structure same as that of the semiconductor ring laser of the first embodiment are shown.

Figure 13:
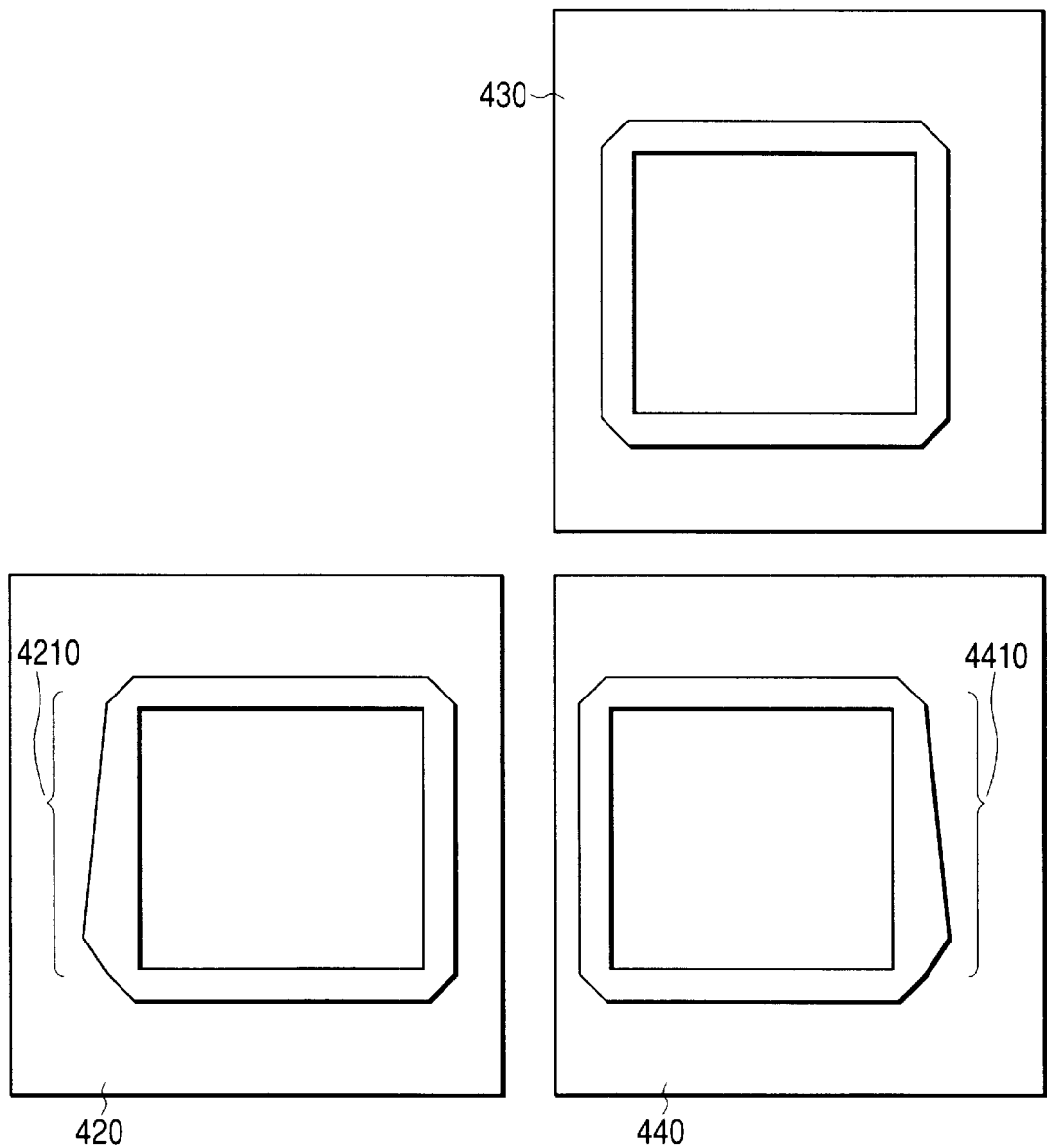
FIG. 13 is a schematic plan view of an optical gyro constituting a third embodiment of the present invention.

The semiconductor ring lasers 420, 440 are provided with tapered portions 4210, 4410 each consisting of a first portion in which the width of the optical wave guide gradually increases along the propagating direction of the clockwise propagating laser light and a second portion in which the width of the optical wave guide gradually decreases, the resonators have the same circumferential length and are in mirror symmetry. The ring resonator semiconductor portion 430 has a circumferential length of the resonator same as that in the semiconductor lasers 420, 440 but is not provided with such tapered portion, as shown in FIG. 13.

In the above-described configuration, the substrate of the semiconductor ring lasers 420, 430, 440 is soldered as a common electrode to the stem 410, while the electrodes of the semiconductor lasers 420, 430, 440 at the side of the capping layer are respectively connected to the electrodes 450 through wires 460.

Connections are made as shown in FIG. 12 so as to supply the devices with currents, and, under current injection, the voltage change between the terminals is detected in each semiconductor ring laser. A circuit shown in FIG. 14 is employed in order to execute the current injection and the voltage detection by the same electrode.

Figure 14:
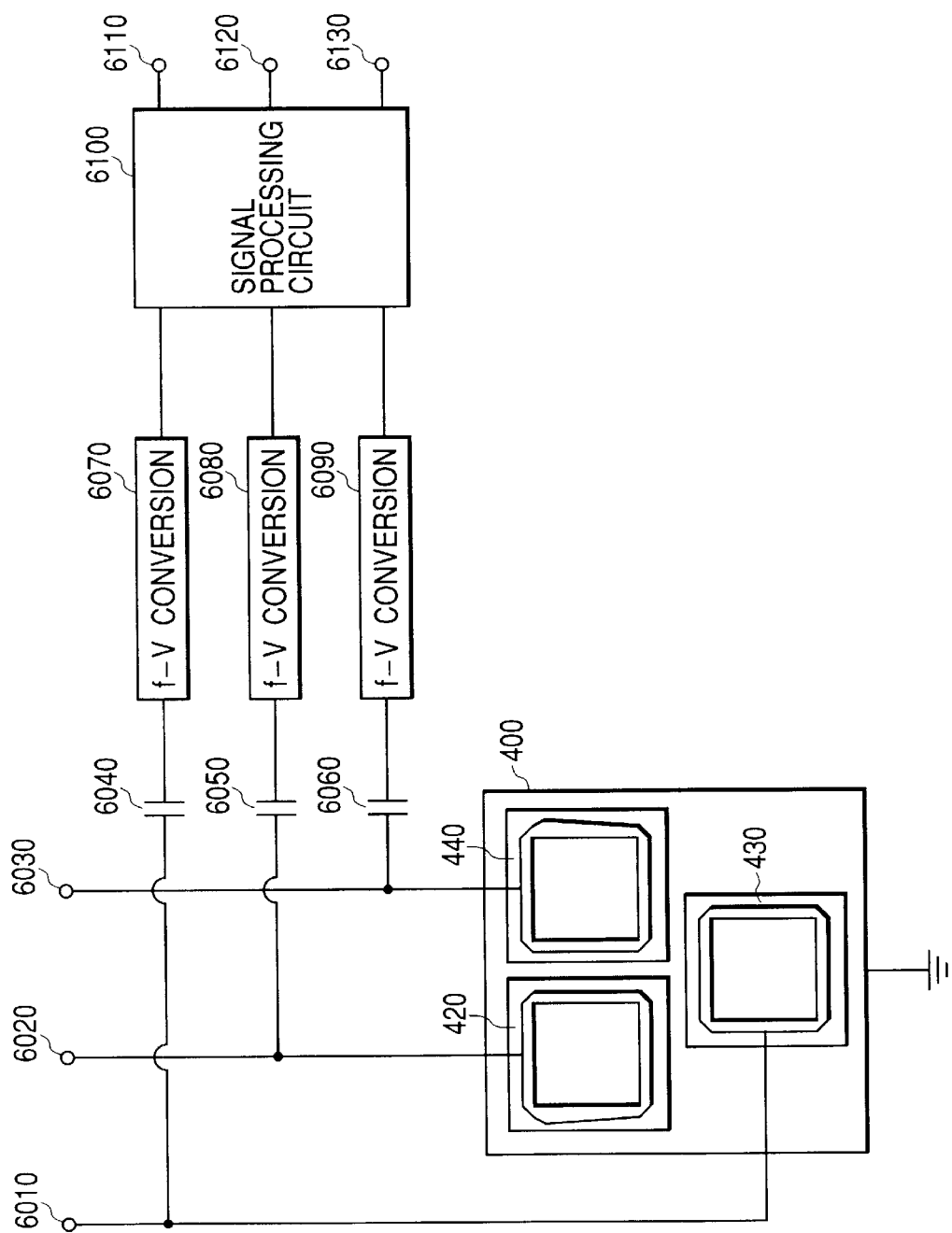
FIG. 14 is a view showing driving and signal processing circuits of the optical gyro of the third embodiment.

In FIG. 14, an optical gyro 400 of the present invention, semiconductor ring lasers 420, 430, 440, driving current input terminals 6010, 6020, 6030, coupling capacitors 6040, 6050, 6060, f-V conversion circuits 6070, 6080, 6090 a signal processing unit 6100, a signal output terminal 6110, a control signal output terminal 6120, and a control signal output terminal 6130 for turning on/off the drive current are shown.

The semiconductor ring lasers 420, 430, 440 are subjected to constant-current driving above the oscillation threshold current, supplied respectively from the terminals 6010, 6020, 6030. In each of the semiconductor ring lasers 420, 430, 440 showing a gain by the injected current above the oscillation threshold, a clockwise propagating laser light and a counterclockwise propagating laser light are generating. Particularly in the semiconductor ring lasers 420, 440 with the tapered portions, the clockwise and counterclockwise propagating laser lights are indpendent and have different oscillation frequencies, thereby generating a light beat.

Figure 15:
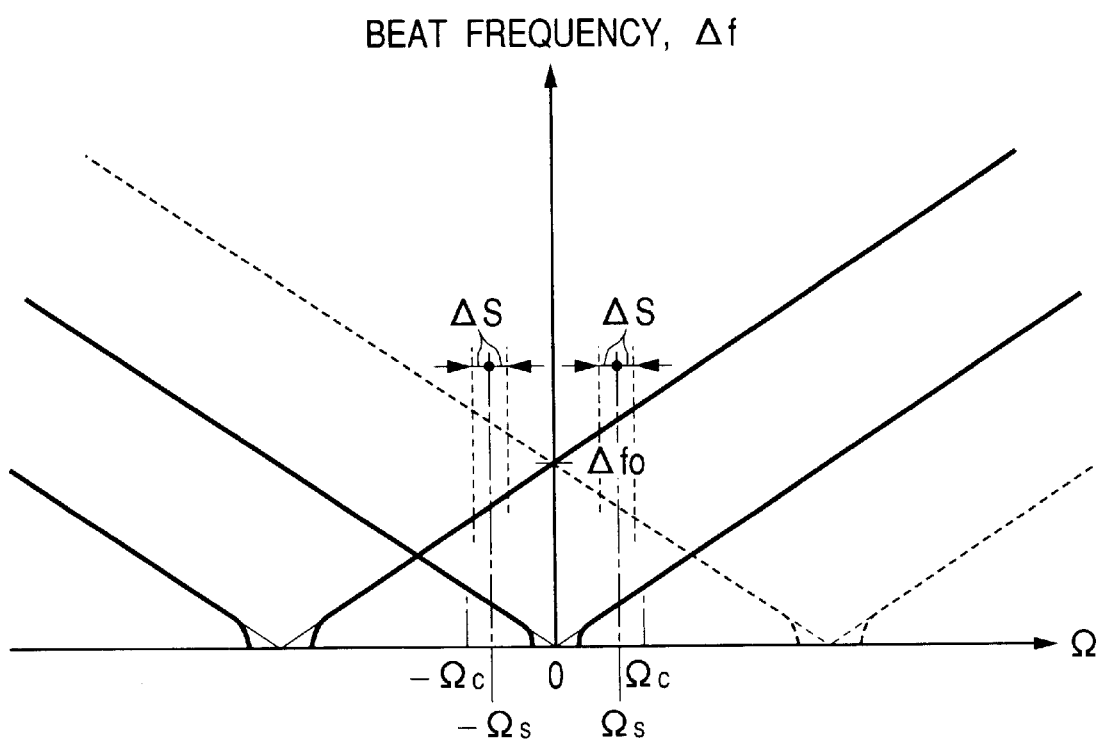
FIG. 15 is a chart showing the relationship of the frequency of a beat signal and the angular velocity in the optical gyro of the third embodiment.

The relationship between the angular velocity and the frequency of the beat signal from each semiconductor ring laser is shown in FIG. 15. The three semiconductor ring lasers 420, 430, 440 have the same ratio S/L of the area S surrounded by the resonator to the optical path length L of the ring resonator, in such a manner that the inclination of the beat frequency as a function of the angular velocity becomes the same. Particularly in the semiconductor ring lasers 420, 440 with the tapered portions are controlled in the driving conditions so as to have the same beat frequency in the standstill state, as will be explained later in more details.

The signal processing circuit shown in FIG. 14 detects the angular velocity in the following manner. The signals indicating the variation in voltage, from the respective semiconductor ring lasers, are transmit the capacitors 6040, 6050, 6060 and such frequency signals are converted into voltages corresponding to the frequencies of the beat signals by the f-V conversion circuits 6070, 6080, 6090. Then the signal processing unit 6100 executes the following processing to obtain an angular velocity signal 6110, an error signal 6120 for adjusting the driving current and an error signal 6130 for turning on/off the driving current.

At first in advance as references, an angular velocity $\Omega c$, at which the lock-in can be negligible in the semiconductor ring laser 430 without the tapered portion, and a smaller angular velocity $\Omega s$ are set.

As in the second embodiment, the processing in the signal processing circuit 6130 is changed in a range $|\Omega|<\Omega c$, and in a range $\Omega c \leq |\Omega|$.

In the range $|\Omega|<\Omega c$, a signal proportional to the angular velocity (including the sign representing the rotating direction), which is obtained as the difference the beat frequencies of the two semiconductor ring lasers 420, 440, is taken as the signal output. Also since the sum of the signal frequencies of the semiconductor ring lasers 420, 440 represents the sum of the beat frequencies in the standstill state, independent from the angular velocity, feedback control is executed on the driving current for the device in such a manner that such sum becomes constant.

In a range $\Omega c \leq |\Omega|$, a signal proportional to the absolute value of the angular velocity can be obtained from the semiconductor ring laser 430 without the tapered portion, and such signal is therefore taken as the signal output. Also the rotating direction (sign of $\Omega$) is determined by comparing the signal frequencies from the semiconductor ring lasers 420, 440 with the reference (beat frequency in the standstill state). Also the difference between each angular velocity, which is obtained from the beat frequencies of the semiconductor ring lasers 420, 440 with the help equation (8), and the angular velocity obtained from the semiconductor ring laser 430 is used as an error signal to execute feedback control on the driving conditions of the semiconductor ring lasers 420, 440 thereby suppressing the variation in the beat frequency in the standstill state. Particularly in the present embodiment, since the semiconductor ring lasers 420, 440, 430 have the same optical path length of the resonator and the same inclination of the beat frequency as a function of the angular velocity, the beat frequency of the semiconductor ring laser 420 in the standstill state can be obtained as a sum or a difference (depending on the rotating direction) of the f-V conversion output 6070 and the f-V conversion output 6080. Also the beat frequency of the semiconductor ring laser 440 in the standstill state can be obtained as a sum or a difference (depending on the rotating direction) of the f-V conversion output 6090 and the f-V conversion output 6070. In this manner, the process for extracting the error signals for control can be simplified.

When the angular velocity thus obtained meets a condition $|\Omega| \leq \Omega s$ ($<\Omega c$), the control signal 6130 for the current supply to the semiconductor ring laser 430 is turned off to interrupt the drive of the laser 430, thereby reducing the electric power consumption. In such a state, since $|\Omega|<\Omega c$, the angular velocity can be obtained from the signals of the semiconductor ring lasers 420, 440 only. Also for the switching angular velocity Ωs, a hysteresis width Δs may be set. For example, the driving is started when the absolute value of the angular velocity Ω exceeds (Ωs+Δs), and is interrupted when it becomes smaller than (Ωs−Δs), in order to avoid frequent on/off operations when the angular velocity varies by small amounts in the vicinity of Ωs.

In the foregoing, a case of turning on/off the drive current for the semiconductor ring laser 430 has been explained. It is also possible to set a second switching angular velocity Ωs2, which is larger than τc. If the absolute value of the angular velocity is larger than the second switching angular velocity, it is possible to interrupt the driving of one of the semiconductor ring lasers with a lower beat frequency. A configuration in which the driving of both the two semiconductor ring lasers with the tapered portions is interrupted in a range where the absolute value of the angular velocity is larger than Ωs2 may be adopted.

In the foregoinga case of utilizing a stem as the casing, but the casing in the present invention may assume any form capable of hybrid mounting of multiple semiconductor ring lasers, such as a box has been explained. Also in the foregoing two embodiments, the ring resonator of the semiconductor laser is rectangular, but it may assume any closed form such as circular or triangular.

Fourth Embodiment

Figure 16A:
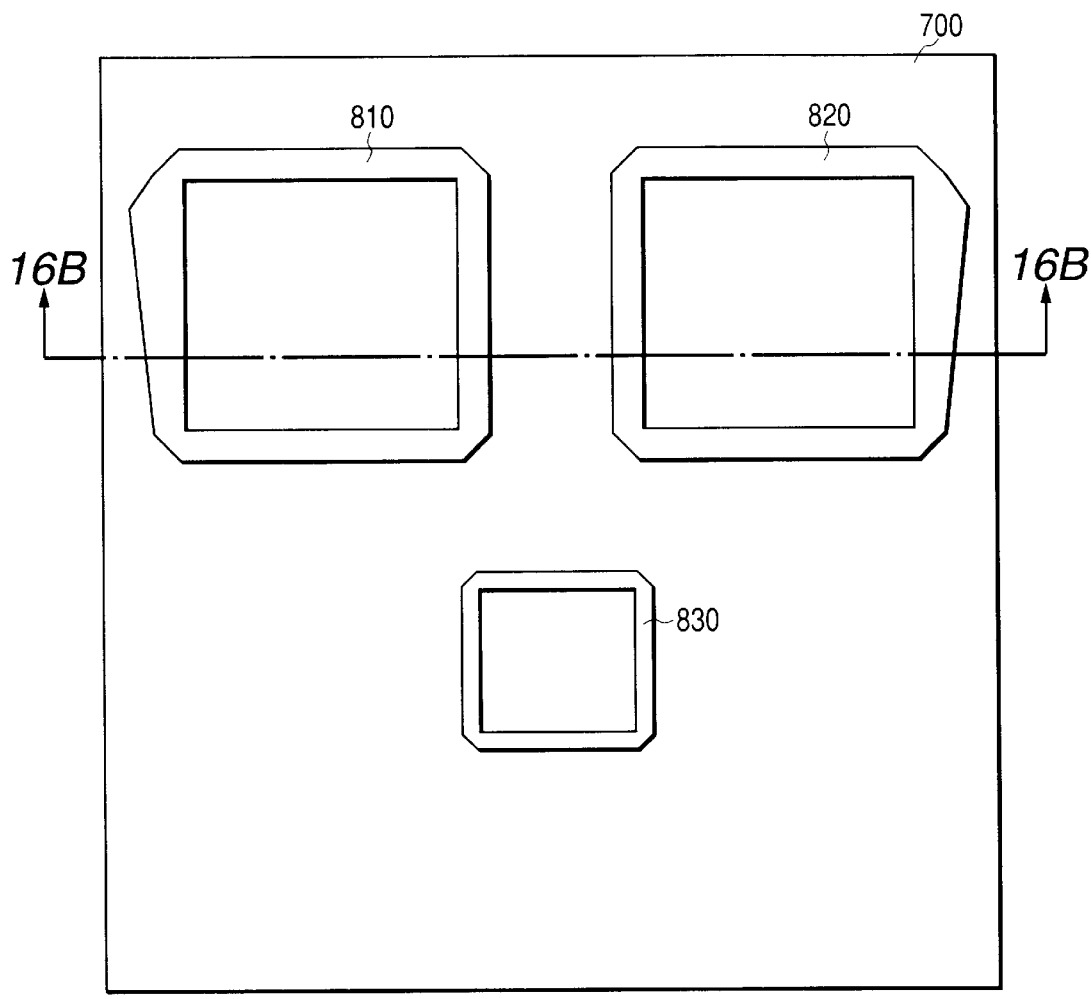
FIGS. 16A and 16B are schematic plan views of an optical gyro constituting a fourth embodiment of the present invention.
Figure 16B:
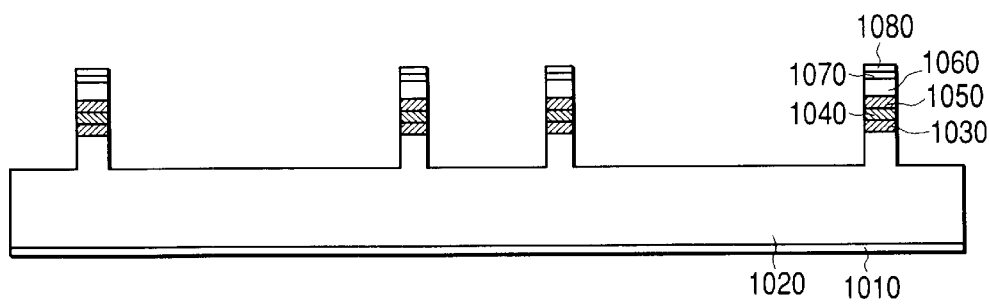

FIGS. 16A and 16B show another embodiment of the optical gyro of the present invention, wherein FIG. 16B is a cross-sectional view along a line 16B—16B in FIG. 16A.

In FIGS. 16A and 16B, an optical gyro 800 of the present invention, semiconductor ring lasers 810, 820 with tapered portions, and a semiconductor ring laser 830 with the tapered portion are shown. The layer structure of the lasers is the same as that in the second embodiment.

Figure 17:
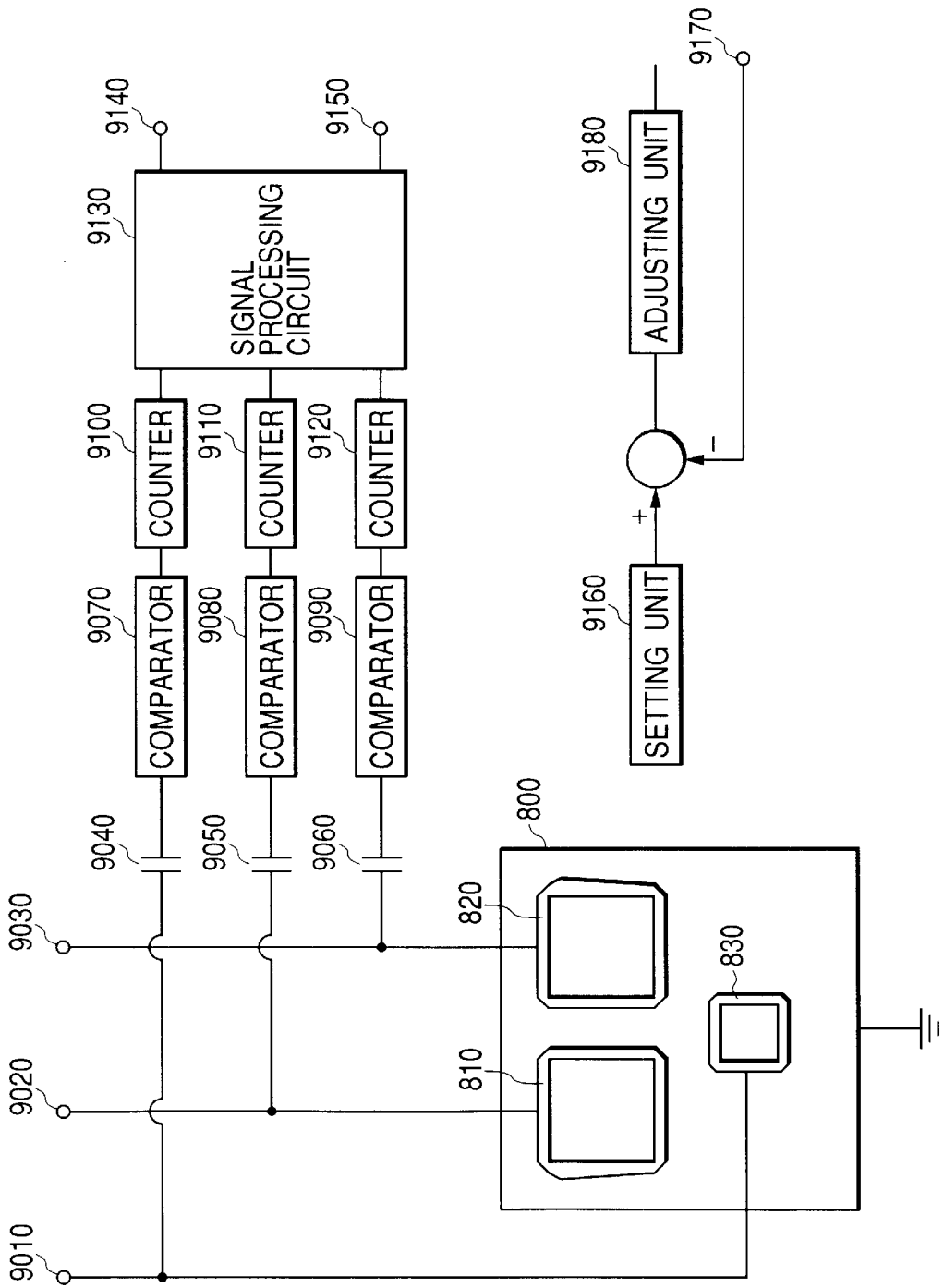
FIG. 17 is a view showing driving and signal processing circuits of the optical gyro of the fourth embodiment.

FIG. 17 shows a driving circuit for the optical gyro of the present invention, wherein driving current input terminals 9010, 9020, 9030, coupling capacitors 9040, 9050, 9060, comparators 9070, 9080, 9090, counters 9100, 9110, 9120, an arithmetic processing circuit 9130, a signal output terminal 9140 and an error signal output terminal 9160 are shown. An injection current setting unit 9160, an error signal input terminal 9170 for a current control block, and an adjusting unit 9180 for the injected current are also provided.

The semiconductor ring lasers 810, 820 are provided with tapered portions and the resonators thereof are in mirror symmetry. Also the semiconductor ring laser 830, in comparison with that of the lasers 810, 820, has a smaller circumferential length of the resonator and a smaller ratio S/L of the area surrounded by the resonator to the circumferential length thereof.

The driving current input terminals 9010, 9020, 9030 are used to respectively drive the semiconductor ring lasers 810, 820, 830 under a constant current above an oscillation threshold current. However, the injection currents are respectively different. As a result, in the semiconductor ring laser 810 (and 820) generating a gain under the injected current above the oscillation threshold, there independently exist a clockwise propagating laser light and a counterclockwise propagating laser light.

In the semiconductor ring lasers 810, 820 with the tapered portions, the clockwise propagating laser light and the counterclockwise propagating laser light are mutually independent and have different oscillation frequencies, thereby generating a beat signal even in the standstill state, owing to the presence of the tapered portion in the wave guide path. As shown by the equation (5), the frequency of the beat signal depends on the difference in the light intensities of the two laser modes of different propagating directions. Therefore, if the injection currents to the two semiconductor ring lasers are different, the two semiconductor ring lasers have different beat frequencies in the standstill state. On the other hand, in the semiconductor ring laser 830 without the tapered portion, the two laser lights in the standstill state have the same frequency and do not generate the beat.

Figure 18:
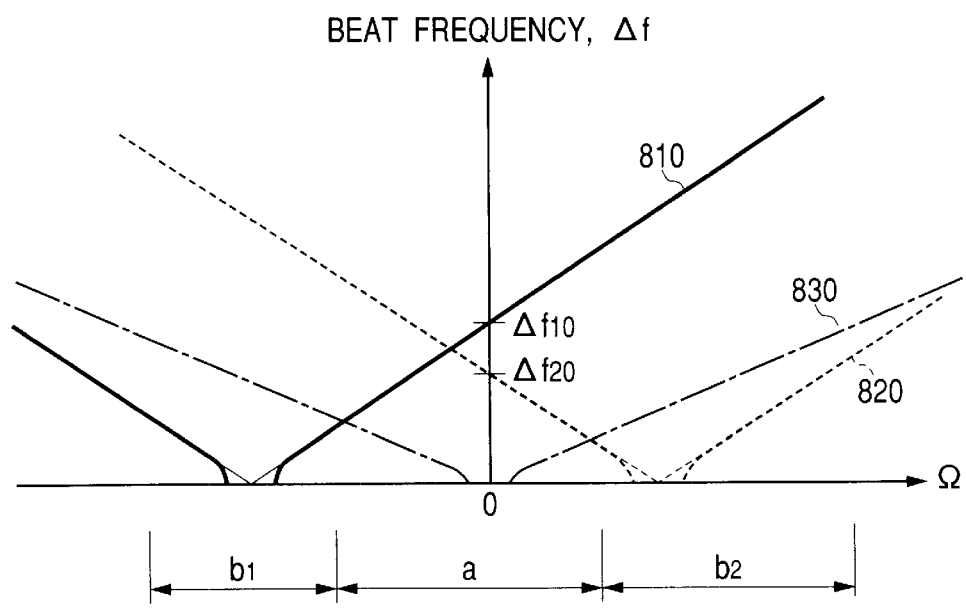
FIG. 18 is a chart showing the relationship of the frequency of a beat signal and the angular velocity in the optical gyro of the fourth embodiment.

FIG. 18 shows the relationship between the rotation angular velocity Ω and the beat frequency Δf of the gyro, wherein a solid line and a broken line respectively represent the characteristics of the semiconductor ring lasers 810, 820. As the absolute inclination of the beat frequency Δf as a function of the angular velocity Ω in a rotated state is represented by $2S(1/\lambda_2+1/\lambda_1)/L$ according to the equation (8), so that the wavelengths of the laser lights in the two semiconductor ring lasers are approximately equal, and can be considered the same in the two devices if S/L is the same. FIG. 18 also shows, by a dash-dotted line, the characteristics of the semiconductor ring laser 830.

The signals indicating the variation in voltage, from the respective semiconductor ring lasers 810, 820, 830, transmit the capacitors 8040, 8050, 8060 and such frequency signals are shaped into rectangular signals by the comparators 8070, 8080, 8090. The numbers of pulses within a predetermined time are counted by the counters 8100, 8110, 8120, and processed in the signal processing circuit.

In an angular velocity range represented by a, the difference of the beat frequencies $(\Delta f_{01}-\Delta f_{02})$ is subtracted from the difference of the beat frequencies of the two semiconductor ring lasers 810, 820 to obtain a signal proportional to the angular velocity.

Also in an angular velocity range represented by b1, the beat frequency $\Delta f_{02}$ of the semiconductor ring laser 820 is subjected to the subtraction of the beat frequency and the addition of a product of the beat frequency of the semiconductor ring laser 830 multiplied by (−2) (namely product of the ratio S/L of the semiconductor ring lasers 820, 830 and (−1) indicating the rotating direction) to obtain a signal proportaional to the angular velocity including the sign.

Also in an angular velocity range represented by b2, the beat frequency of the semiconductor ring laser 810 is subjected to the subtraction of the beat frequency $\Delta f_{02}$ in the standstill state and the addition of twice of the beat frequency of the semiconductor ring laser 830 (namely the ratio S/L of the semiconductor ring lasers 810, 830) to obtain a signal 9140 proportaional to the angular velocity.

Also in the angular velocity range represented by a, the beat frequencies of the two semiconductor ring lasers 810, 820, are added to obtain an amount $(\Delta f_{01}+\Delta f_{02})$ independent of the angular velocity. In the angular velocity range represented by b1, a twice amount of the beat frequency of the semiconductor ring laser 820 is subtracted from the beat frequency of the semiconductor ring laser 820 to obtain an amount $\Delta f_{02}$ independent of the angular velocity. Also the angular velocity range represented by b2, a twice amount of the beat frequency of the semiconductor ring laser 830 is subtracted from the beat frequency of the semiconductor ring laser 810 to obtain an amount $\Delta f_{01}$ independent of the angular velocity. These amounts are taken out as error signals 9150 and fed back to feedback control circuits for the drive currents. The error signal 9150 is used as the error signal 9170 for the amount ($\Delta f_{o1}+\Delta f_{o2}$, $\Delta f_{o2}$ or $\Delta f_{o1}$ according to the angular velocity range) preset in the setting unit 9160 for regulating the laser driving current in the adjusting unit 9180.

As explained in the foregoing, the processing utilizing the beat frequencies from the three devices provides the signal proportional to the angular velocity, including the sign representing the rotating direction. Also feedback control is executed to stabilize the signal not dependent on the angular velocity, thereby providing an optical gyro excellent in stability.

In the foregoing three embodiments, a case of executing constant-current drive and detecting the variation in the terminal voltage corresponding to the angular velocity of the device has been explained, but it is also possible to detect the angular velocity, as will be apparent from the principle to detect the variation in the device impedance resulting from the angular velocity of the device during its activated state, for example by executing constant-voltage driving and detecting the variation in the current, or by measuring the change in the impedance by other impedance measuring methods.

What is claimed is:

1. An optical gyro provided with a ring laser and detection means for detecting the beat frequency of said ring laser, comprising a first ring laser of which beat frequency decreases when the angular velocity increases in a certain direction from a standstill state and a second ring laser of which beat frequency increases when the angular velocity increases regardless of the rotating direction, wherein said first and second ring lasers are positioned so as to be mutually independent optically.

2. An optical gyro according to claim 1, wherein, in said first ring laser, said beat frequency in the standstill state is not zero.

3. An optical gyro according to claim 1, wherein said second ring laser is capable of providing the same beat frequency for the same angular velocity, regardless of the rotating direction.

4. An optical gyro according to claim 1, wherein, in said first ring laser, two counterpropagating laser lights have different oscillation frequencies in the standstill state, and, in said second ring laser, two counterpropagating laser lights have the same oscillation frequency.

5. An optical gyro according to claim 1, further comprising an absorbent member or a light shielding member for preventing optical coupling between said first and second ring lasers.

6. An optical gyro according to claim 1, wherein the gyro comprises:
a third semiconductor ring laser showing an increase in the frequency of the impedance variation when said first ring laser shows a decrease in the frequency of the impedance variation.

7. An optical gyro according to claim 1, wherein a ratio of the area surrounded by the resonator to the circumferential length of the resonator in said first ring laser is the same as said ratio in said second ring laser.

8. An optical gyro according to claim 1, wherein said first and second ring lasers are positioned on mutually non-perpendicular planes.

9. An optical gyro according to claim 1, wherein said first and second ring lasers are positioned on mutually parallel planes.

10. An optical gyro according to claim 9, wherein said mutually parallel planes constitute the same plane.

11. An optical gyro according to claim 1, wherein an absorbent member or a light shielding member for preventing optical coupling is provided in at least either of said first and second ring lasers.

12. An optical gyro according to claim 1, wherein said beat frequency is the frequency of variation in the impedance of said first and second ring lasers.

13. An optical gyro according to claim 1, wherein said beat frequency is detected from electrical terminals provided in said first and second ring lasers.

14. A driving method for an optical gyro according to claim 1, which comprises executing constant-current driving for each of said first and second ring lasers and detecting a change in voltage from said electrical terminals.

15. A driving method for an optical gyro according to claim 1, which comprises executing constant-voltage driving for each of said first and second ring lasers and detecting a change in drive current from said electrical terminals.

16. A driving method for an optical gyro according to claim 14 or 15, wherein injected currents or applied voltages to said first and second ring lasers are mutually the same.

17. A signal processing method for an optical gyro according to claim 1, wherein the method of signal processing is switched according to the value of the angular velocity.

18. A signal processing method for an optical gyro according to claim 17, wherein, if the absolute value of the angular velocity is smaller than a predetermined value, a signal from said first ring laser is used for obtaining the angular velocity.

19. A signal processing method for an optical gyro according to claim 17, wherein, if the absolute value of the angular velocity is larger than a predetermined value, a signal from said second ring laser is used for obtaining the absolute value of the angular velocity.

20. A signal processing method for an optical gyro according to claim 17, wherein, in a first angular velocity range, a signal from said first ring laser and a signal from said second ring laser are processed to determine the beat frequency in the standstill state, and, in a second angular velocity range, said beat frequency in the standstill state and a signal from said first ring laser are used for obtaining the angular velocity.

21. A signal processing method for an optical gyro according to claim 17, wherein an angular velocity range is determined according to the result of processing of a signal from said first ring laser and a signal from said second ring laser, and the signal processing method is switched according to said range.

22. A signal processing method for an optical gyro according to claim 1, wherein a signal from said first ring laser and a signal from said second ring laser are processed and the rotating direction is detected from the result of said processing.

23. A signal processing method for an optical gyro according to claim 22, wherein said processing is a subtraction weighted by a ratio of the circumferential length of each ring resonator to the area surrounded by the resonator.

24. A signal processing method for an optical gyro according to claim 1, wherein, in said first ring laser, the frequency of impedance variation is compared with a reference frequency, and the rotating direction is obtained from the result of said comparison.

25. A driving method for an optical gyro according to claim 1, wherein the control method for the driving condition is switched according to the value of the angular velocity signal obtained from said optical gyro.

26. A driving method for an optical gyro according to claim 25, wherein at least one of said control method is feedback control for processing a signal from said first ring laser and a signal from said second ring laser to obtain a value corresponding to the beat frequency in the standstill state, and stabilizing said value.

27. A driving method for an optical gyro according to claim 26, wherein said processing is addition or subtraction weighted by a ratio of the circumferential length of the respective resonator to the area surrounded by the resonator.

28. A driving method for an optical gyro according to claim 25, wherein at least one of said control method is to take the angular velocity obtained from said second ring laser as reference and to match the angular velocity obtained from said first ring laser with said reference.

29. An optical gyro according to claim 1, further comprising an absorbent member or a light shielding member for preventing optical coupling between said first and second ring lasers.

30. An optical gyro according to claim 1, wherein the gyro comprises:
a third semiconductor ring laser showing an increase in the frequency of the impedance variation when said first ring laser shows a decrease in the frequency of the impedance variation.

* * * * *

UNITED STATES PATENT AND TRADEMARK OFFICE
CERTIFICATE OF CORRECTION

PATENT NO. : 6,586,725 B2
DATED : July 1, 2003
INVENTOR(S) : Natsuhiko Mizutani et al.

It is certified that error appears in the above-identified patent and that said Letters Patent is hereby corrected as shown below:

<u>Title page,</u>
After Item [57], ABSTRACT, "30 Claims," should read -- 28 Claims, --.

<u>Column 1,</u>
Line 40, "are" should read -- is --.

<u>Column 2,</u>
Line 1, "are" should read -- are, --.
Line 9, "a such" should read -- such a --.
Line 21, "obtain," should read -- obtained --.
Line 47, "in" should be deleted.
Line 66, "state,and" should read -- state and --.

<u>Column 4,</u>
Line 47, "generat" should read -- generate --.

<u>Column 6,</u>
Line 33, "it" (second occurrence) should read -- is --.

<u>Column 7,</u>
Line 60, "current." should read -- current --.
Line 64, "voltage,or" should read -- voltage or --.

<u>Column 8,</u>
Lines 1 and 34, "velocity dependent" should read -- velocity-dependent --.

<u>Column 9,</u>
Lines 9 and 32, "velocity dependent" should read -- velocity-dependent --.

<u>Column 10,</u>
Line 31, "obtain" should read -- obtained --.

<u>Column 11,</u>
Line 15, "velocity defendent" should read -- velocity-dependent --.
Line 28, "the," should read -- the --.

<u>Column 14,</u>
Line 11, "does" should read -- do -- and "generated" should read -- generate --.

UNITED STATES PATENT AND TRADEMARK OFFICE
CERTIFICATE OF CORRECTION

PATENT NO.     : 6,586,725 B2
DATED          : July 1, 2003
INVENTOR(S)    : Natsuhiko Mizutani et al.

It is certified that error appears in the above-identified patent and that said Letters Patent is hereby corrected as shown below:

Column 15,
Line 19, "result" should read -- result in --.

Column 16,
Line 5, "be" should be deleted.

Column 19,
Line 48, "be," should read -- be --.

Column 20,
Line 66, "obserbed" should read -- observed --.

Column 21,
Line 10, "independent by." should read -- independently. --.
Line 26, "a" should be deleted.
Line 27, "scattering" should read -- scattering in --.

Column 22,
Line 15, "cannot be obtained" should be deleted.
Line 50, "driveing" should read -- driving --.

Column 23,
Line 50, "the" (first occurrence) should read -- in the -- and "which" should be deleted.
Line 51, "the" should read -- in the -- and "difference" should read -- difference --.

Column 24,
Line 8, "a" should read -- $\Omega$ --.
Line 11, "f_ $\leqq$ $\Delta$ f$_o$," should read -- f_ $\geq$ $\Delta$ f$_o$, --.

Column 25,
Line 1, "driving." should read-- driving, --.
Line 67, "be" should be deleted, and "maltiple" should read -- multiple --.

Column 28,
Line 20, "mutually" should read -- prevent mutual --.

UNITED STATES PATENT AND TRADEMARK OFFICE
CERTIFICATE OF CORRECTION

PATENT NO. : 6,586,725 B2
DATED : July 1, 2003
INVENTOR(S) : Natsuhiko Mizutani et al.

It is certified that error appears in the above-identified patent and that said Letters Patent is hereby corrected as shown below:

Column 30,
Line 3, "observab" should read -- observable --.

Column 31,
Line 29, "difference" should read -- difference in --.

Column 32,
Line 37, "method." should read --methods. -.

Column 33,
Line 10, "da" should read -- a --.
Line 15, "440." should read -- 440 are shown --.
Line 55, "generating." should read -- generated. --.

Column 34,
Line 9, "are" should be deleted.

Column 35,
Line 12, "τc." should read -- Ωc. --.
Line 20, "foregoinga" should read -- foregoing, a --.

Column 40,
Lines 1 to 9, should be deleted. (Identical to Claims 5 and 6).

Signed and Sealed this

Twenty-sixth Day of October, 2004

JON W. DUDAS
*Director of the United States Patent and Trademark Office*